United States Patent
Sun et al.

(10) Patent No.: US 11,134,509 B2
(45) Date of Patent: Sep. 28, 2021

(54) UPLINK (UL) TRANSMISSION WITH FLEXIBLE STARTING POSITIONS FOR NEW RADIO-UNLICENSED (NR-U)

(71) Applicant: QUALCOMM INCORPORATED, San Diego, CA (US)

(72) Inventors: Jing Sun, San Diego, CA (US); Xiaoxia Zhang, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/662,984

(22) Filed: Oct. 24, 2019

(65) Prior Publication Data
US 2020/0137779 A1   Apr. 30, 2020

(30) Foreign Application Priority Data

Oct. 29, 2018   (IN) .............................. 201841040759

(51) Int. Cl.
*H04W 72/12* (2009.01)
*H04W 16/14* (2009.01)
(Continued)

(52) U.S. Cl.
CPC ....... *H04W 72/1268* (2013.01); *H04W 16/14* (2013.01); *H04W 72/1215* (2013.01); *H04W 72/14* (2013.01); *H04W 74/0808* (2013.01)

(58) Field of Classification Search
USPC ........................................................ 370/330
See application file for complete search history.

(56) References Cited

U.S. PATENT DOCUMENTS

2006/0239239 A1* 10/2006 Yang ................... H04W 74/006
370/342
2013/0301541 A1* 11/2013 Mukherjee ........ H04W 74/0833
370/329
(Continued)

OTHER PUBLICATIONS

International Search Report and Written Opinion—PCT/US2019/058151—ISAEPO—dated Jul. 2, 2020.
(Continued)

*Primary Examiner* — Robert J Lopata
(74) *Attorney, Agent, or Firm* — Liem T. Do

(57) ABSTRACT

Wireless communications systems and methods related to uplink (UL) communications in a wireless network are provided. In one embodiment, a first wireless communication device receives a transmission grant indicating a transmission period. The first wireless communication device selects a starting location for transmitting a communication signal from among a plurality of starting locations within the transmission period. The first wireless communication device transmits the communication signal during the transmission period based on the selected starting location. In one embodiment, a first wireless communication device transmits, to a second wireless communication device, a transmission grant indicating a transmission period. The first wireless communication device monitors for a communication signal from the second wireless communication device in the transmission period. The first wireless communication device identifies, upon detection of the communication signal, a starting location of the communication signal from among a plurality of starting locations within the transmission period.

25 Claims, 17 Drawing Sheets

(51) Int. Cl.
*H04W 74/08* (2009.01)
*H04W 72/14* (2009.01)

(56) References Cited

U.S. PATENT DOCUMENTS

| | | | | |
|---|---|---|---|---|
| 2015/0312887 | A1* | 10/2015 | Xia | H04W 72/005 370/329 |
| 2016/0007377 | A1* | 1/2016 | Frenne | H04W 56/001 370/329 |
| 2017/0325225 | A1* | 11/2017 | Dinan | H04W 72/0446 |
| 2019/0223222 | A1* | 7/2019 | Nagaraja | H04L 1/1861 |
| 2019/0260628 | A1* | 8/2019 | Lin | H04L 27/2607 |
| 2019/0394792 | A1* | 12/2019 | Jeon | H04W 16/14 |
| 2020/0015276 | A1* | 1/2020 | Reial | H04W 74/0866 |
| 2020/0120719 | A1* | 4/2020 | Wang | H04W 72/1268 |
| 2020/0187249 | A1* | 6/2020 | Yang | H04L 1/1887 |
| 2020/0389916 | A1* | 12/2020 | Salem | H04L 5/0032 |

OTHER PUBLICATIONS

Huawei, et al., "NR Numerology and Frame Structure for Unlicensed Bands," 3GPP Draft, 3GPP TSG RAN WG1 Meeting #94, R1-1808058, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515462, 10 pages, Retrieved from the Internet: URL: http://www.3gpp.org/ftp/tsg%5Fran/WG1%5FRL1/TSGR1%5F94/Docs/R1%2D1808058%2Ezip, [retrieved on Aug. 10, 2018], figures 2-6.

Intel Corporation: "On the Multiple Uplink Starting and Ending Positions for FS3", 3GPP Draft, 3GPP TSG RAN WG1 Meeting #88bis, R1-1704682, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, Apr. 2, 2017 (Apr. 2, 2017), XP051242821, 6 pages, Retrieved from the Internet: URL: http://www.3gpp.org/ftp/Meetings_3GPP_SYNC/RAN1/Docs/ [retrieved on Apr. 2, 2017], figures 1-3, sections 1, 2, 3.1, 3.2.

LG Electronics: "HARQ Procedure for NR Unlicensed Operation", 3GPP Draft, 3GPP TSG RAN WG1 Meeting #94, R1-1808509, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515887, 5 pages, Retrieved from the Internet: URL: http://www.3gpp.org/ftp/tsg%5Fran/WG1%5FRL1/TSGR1%5F94/Docs/R1%2D1808509%2Ezip [retrieved on Aug. 11, 2018] sections 1, 2.

Partial International Search Report—PCT/US2019/058151—ISA/EPO—dated Feb. 19, 2020.

Samsung: "Multiple Starting and Ending Positions for UL," 3GPP Draft, 3GPP TSG RAN WG1 Meeting 90bis, R1-1717549, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017-Oct. 13, 2017, Oct. 8, 2017 (Oct. 8, 2017), XP051340735, 3 pages, Retrieved from the Internet: URL: http://www.3gpp.org/ftp/Meetings_3GPP_SYNC/RAN1/Docs/ [retrieved on Oct. 8, 2017] sections 1, 2, 2.1.

\* cited by examiner

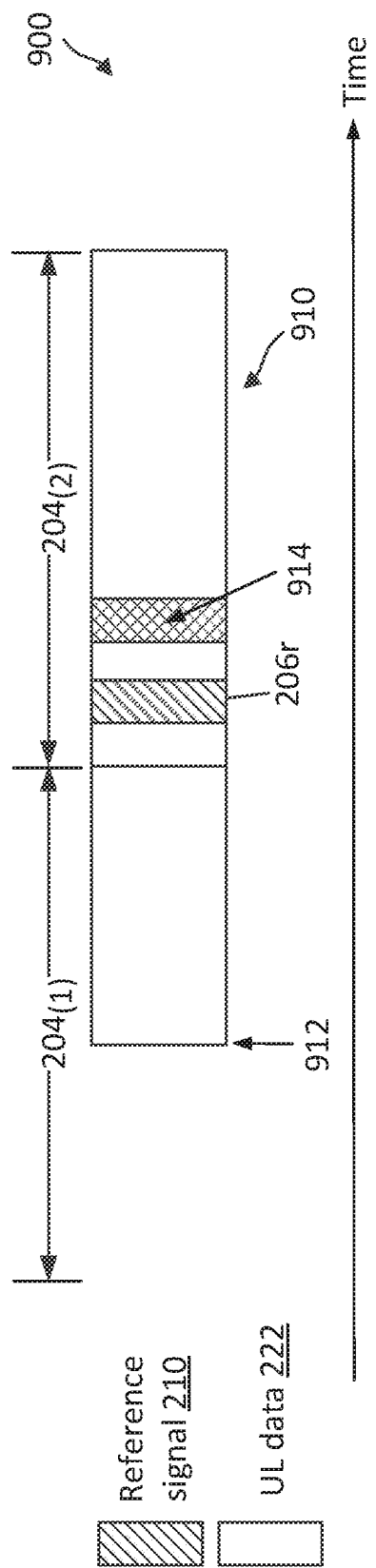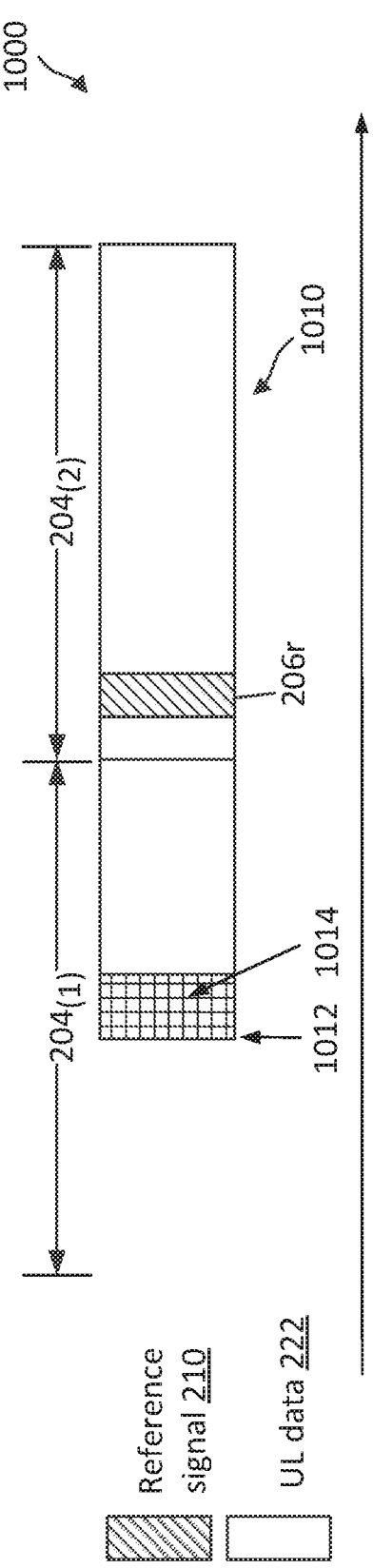

UPLINK (UL) TRANSMISSION WITH FLEXIBLE STARTING POSITIONS FOR NEW RADIO-UNLICENSED (NR-U)

CROSS REFERENCE TO RELATED APPLICATIONS

The present application claims priority to and the benefit of Indian Provisional Patent Application No. 201841040759, filed Oct. 29, 2018, which is hereby incorporated by reference in its entirety as if fully set forth below and for all applicable purposes.

TECHNICAL FIELD

This application relates to wireless communication systems, and more particularly to uplink (UL) communications in a wireless network over spectrum shared by multiple network operating entities.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an uplink (UL) transmission over an unlicensed frequency band in a certain time period and the UE may perform an LBT prior to the scheduled time period. However, depending on the outcome of the UE's LBT, the UE may or may not be able to transmit according the scheduled time period.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device from a second wireless communication device, a transmission grant indicating a transmission period; selecting, by the first wireless communication device, a starting location for transmitting a communication signal from among a plurality of starting locations within the transmission period; and transmitting, by the first wireless communication device to the second wireless communication device in response to the transmission grant, the communication signal during the transmission period based on the selected starting location.

In an additional aspect of the disclosure, a method of wireless communication includes transmitting, by a first wireless communication device to a second wireless communication device, a transmission grant indicating a transmission period; monitoring, by the first wireless communication device in response to the transmission grant, for a communication signal from the second wireless communication device in the transmission period; and identifying, by the first wireless communication device upon detection of the communication signal, a starting location of the communication signal from among a plurality of starting locations within the transmission period.

In an additional aspect of the disclosure, a method of wireless communication device includes communicating, by a first wireless communication device with a second wireless communication device, a configuration indicating a plurality of random access opportunities within a transmission period, the plurality of random access opportunities beginning at different starting time locations and at least partially overlapping with each other in time; and communicating, by the first wireless communication device with the second wireless communication device, a random access preamble signal during a first random access opportunity of the plurality of random access opportunities.

In an additional aspect of the disclosure, an apparatus includes a processor configured to select a starting location for transmitting a communication signal from among a plurality of starting locations within a transmission period; and a transceiver configured to receive, from a first wireless communication device, a transmission grant indicating the transmission period; and transmit, to the first wireless communication device in response to the transmission grant, the communication signal during the transmission period based on the selected starting location.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates a communication scheme that provisions multiple flexible transmission starting positions for a UL transmission according to some embodiments of the present disclosure.

FIG. 10 illustrates a communication scheme that provisions multiple flexible transmission starting positions for a UL transmission according to some embodiments of the present disclosure.

DETAILED DESCRIPTION

Figure 1:
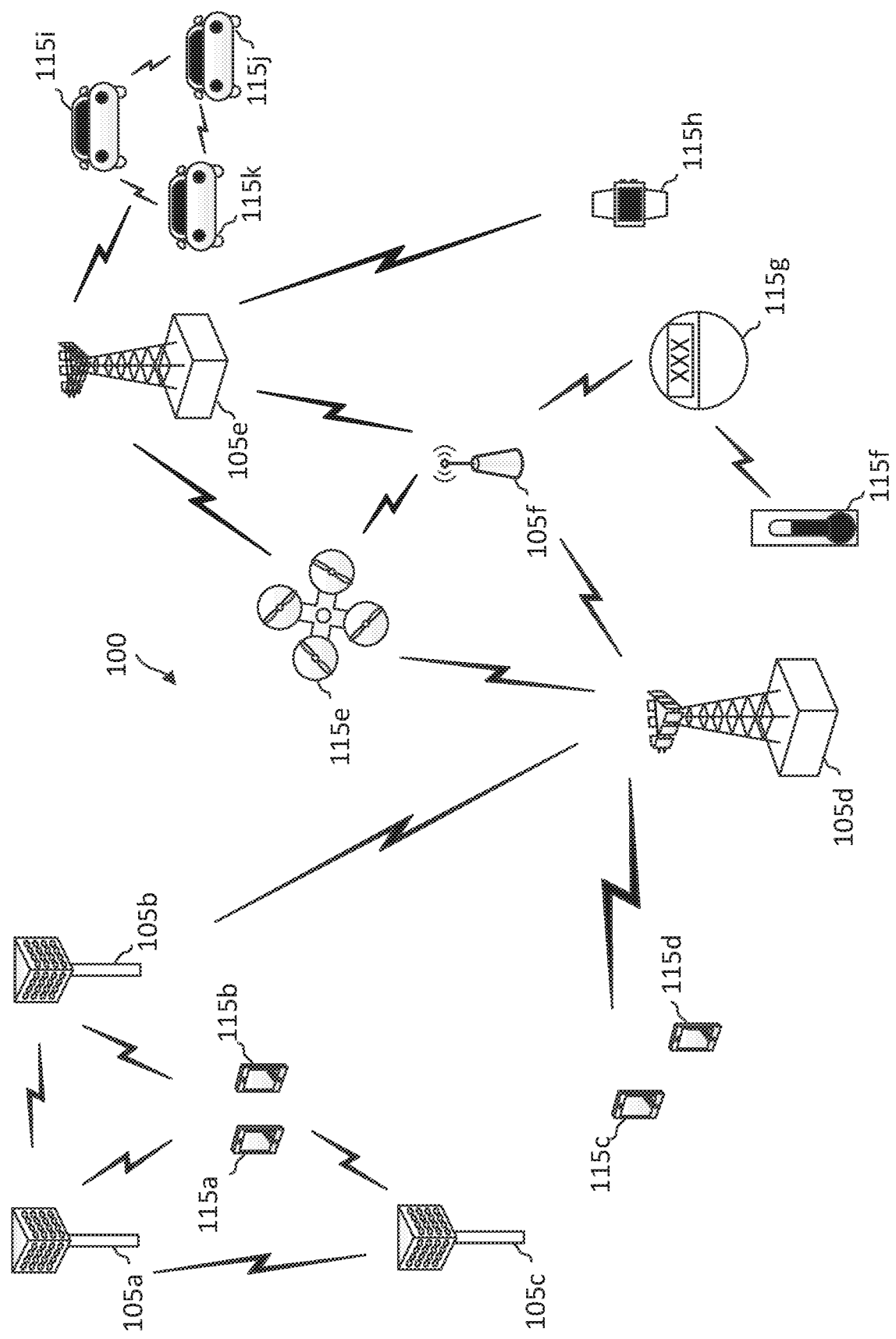
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over $80/100$ MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to provision multiple flexible starting transmission positions for an uplink (UL) transmission in a shared spectrum or an unlicensed spectrum. In the disclosed embodiments, a BS configures a UE with a reference signal configuration and a rule for identifying allowable starting transmission positions. The reference signal configuration indicates symbols within a slot that are allocated for reference signal transmissions. In addition, the reference signal configuration may indicate a different scrambling sequence for a reference signal transmission at each starting position. The BS may grant a UE for a UL transmission in one or more transmission slots (e.g., a time period) over the spectrum. The UE may identify the allowable starting positions in the allocated time period based on the rule. The UE may perform a listen-before-talk (LBT) in the spectrum based on the allocated time period. Depending on the time when the UE passes an LBT, the UE may identify a starting position from among the allowable starting positions. The UE may transmit a UL communication signal beginning at the identified starting position. The UE may include one or more reference signals in the UL communication signal based on the reference signal configuration. The UE may also use a different scrambling sequence, from the configuration, for the reference signals depending on the starting position.

In an embodiment, the rule associates the allowable starting UL transmission positions with locations of the configured reference signal symbols. The rule can further associate the allowable starting UL transmission positions with the number of reference signal symbols within a slot. In an embodiment, the BS may control the timing and the number of allowable starting positions by varying the reference signal symbol locations and/or time-density. In such an embodiment, the BS may detect the presence of a UL communication signal from the UE based on reference signal monitoring at the configured reference signal symbols. The BS may determine a starting location of the UL communication signal based on the configured rule.

In another embodiment, the rule allows a UE to begin a UL transmission at any symbol within an allocated time period. To assist BS detection, the UL communication signal can include information (e.g., uplink control information (UCI)) about the transmission (e.g., the starting symbol) or include a preamble signal at the beginning of the UL communication signal. In such an embodiment, the BS may receive the UL communication based on UCI monitoring or preamble signal monitoring. In some instances, the UL communication signal may span multiple slots and may start at a time after a last reference signal symbol in a first slot of the multiple slots. As such, the BS may not receive any reference signal in the first slot. However, the BS may receive a reference signal in a subsequent slot. As such, the BS may recover data from the portion of the UL communication signal received in the first slot based on a channel response estimated from the reference signal received in the subsequent slot. In an embodiment, the preamble signal can include a signal pattern that can be used for channel estimation by the BS.

In an embodiment, the BS may provision for multiple random access opportunities for a random access occasion. The multiple random access opportunities may begin at different time locations and may at least partially overlap with each other in time. In other words, the random access opportunities may have different durations. The UE may perform an LBT in the spectrum. Depending on the time when the UE passes an LBT, the UE may transmit a random access preamble signal using one of the random access opportunities. The BS may configure the UE with a random access preamble signal format for a particular random access configuration and may allow the UE to use a full version or a truncated version of the random access preamble signal format depending on the selected random access opportunity. The BS may configure the random access preamble signal formats based on whether the random access occasion is within a transmission opportunity (TXOP) of the BS or outside a TXOP of the BS.

Aspects of the present application can provide several benefits. For example, the multiple flexible starting locations for UL data transmissions and/or random access can provide a UE with more transmission opportunities in case the UE is initially gated by an LBT and passes an LBT at a later time within the allocated time period or the random access occasion time period. The association of the starting locations with the reference signal symbols, the inclusion of the UCI in a UL communication signal, or the inclusion of the preamble signal in a UL communication signal can reduce search or monitoring complexity at the BS.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL)

transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel.

Figure 2:
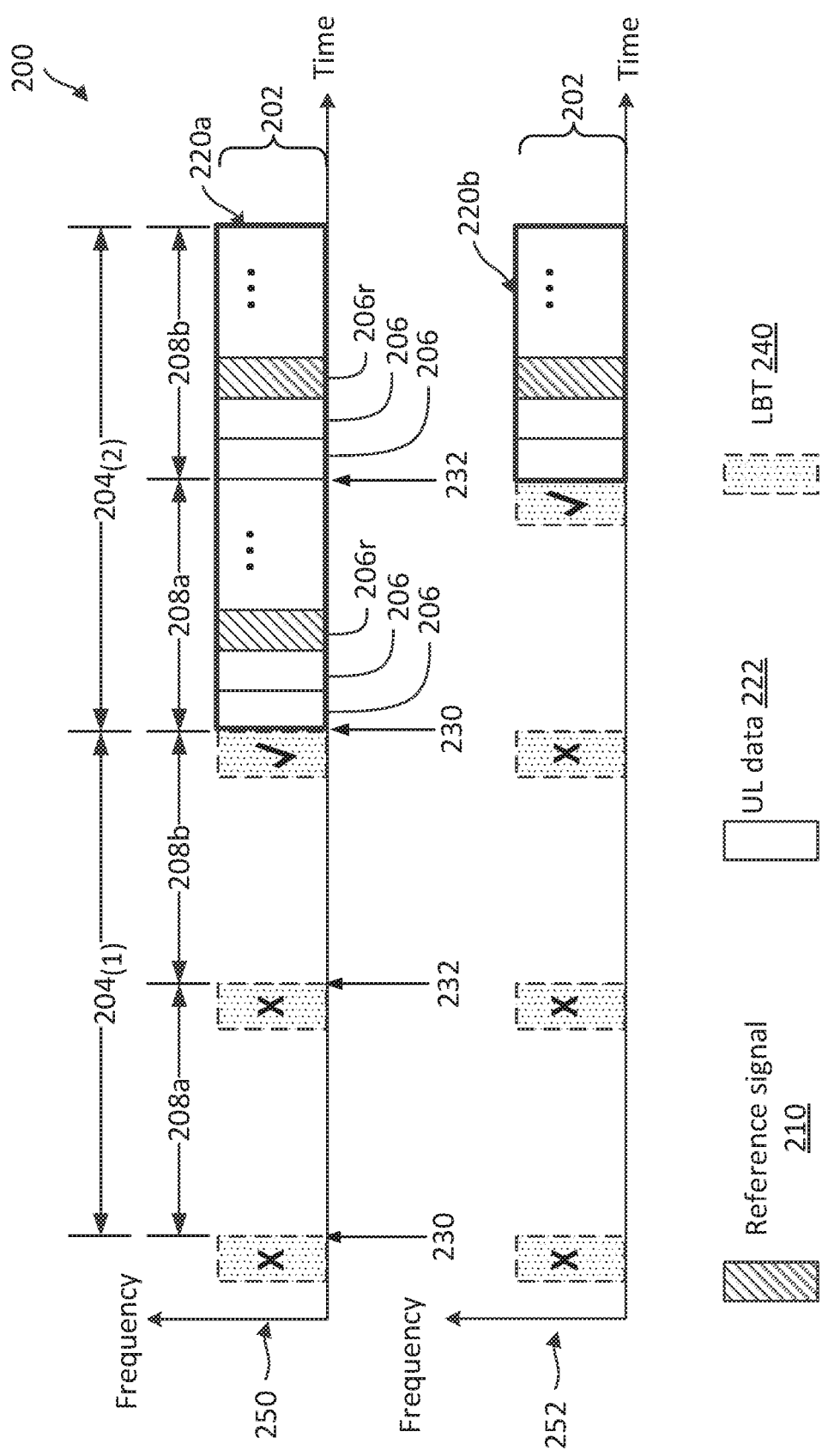
FIG. 2 illustrates an uplink (UL) communication scheme according to some embodiments of the present disclosure.

FIG. 2 illustrates a UL communication scheme 200 according to some embodiments of the present disclosure. In FIG. 2, the x-axis represents time in some constant units and the y-axis represents frequency in some constant units. The scheme 200 may be employed by BSs such as the BSs 105 and UEs such as the UEs 115 in a network such as the network 100 to communicate with each other over a frequency channel 202. The frequency channel 202 may be within a shared spectrum or an unlicensed spectrum. The frequency channel 202 may be located at any suitable frequencies. For example, the frequency channel 202 may be located at about 3.5 GHz, sub-6 GHz, or at mmWave frequencies. As described above, an LBT is required prior to a transmission in a shared frequency band or unlicensed frequency band and a UE may or may not be able to transmit according to a scheduled time depending on the outcome of the LBT. Accordingly, the scheme 200 schedules UL data transmissions in units of slots 204 and supports half-slot level resolution for starting a UL data transmission. The UL data transmission may be referred to as a PUSCH transmission.

Each slot 204 includes a plurality of symbols 206. The number of symbols 206 within a slot 204 may vary depending on the embodiments. In some embodiments, each slot 204 may include about 14 symbols 206 (e.g., in a normal cyclic prefix (NCP) mode) and may span a duration of about 1 millisecond (ms). In some other embodiments, each slot 204 may include about 12 symbols 206 (e.g., in an extended cyclic prefix (ECP) mode) and may span a duration of about 1 ms. Each slot 204 may be time-partitioned into a first half-slot 208a and a second half-slot 208b.

One or more of the symbols 206 within a slot 204 may be allocated for transmissions of reference signals 210. The symbols 206 allocated for reference signal transmissions are shown as 206r. The reference signals 210 may be referred to as demodulation reference signals (DMRSs). The reference signals 210 may include pilot symbols distributed across the frequency channel 202. The pilot symbols may be generated from a predetermined sequence with a certain pattern. The remaining symbols 206 may carry UL data. The reference signals 210 allows a receiver to determine a channel estimate for the frequency channel 202, where the channel estimate may be used to recover the UL data. The number of reference signal symbols 206r and/or the locations of the reference signal symbols 206r within a slot 204 may vary depending on the embodiments.

In an example, a BS allocates two slots $204_{(1)}$ and $204_{(2)}$ for a UE to transmit a UL communication signal 220. The BS may provide the UE with a scheduling grant indicating the allocated slots $204_{(1)}$ and $204_{(2)}$. In addition, the BS may indicate to the UE that a UL transmission may start at a slot boundary (e.g., shown by the arrows 230) or at a half-slot boundary (shown by the arrows 232).

The UE may perform LBTs 240 at the slot boundaries and/or at the half-slot boundaries. The LBT 240 may be based on energy detection or signal detection (e.g., detecting a particular preamble signal or a certain sequence pattern). In one scenario 250, the UE fails the LBTs 240 in the slot $204_{(1)}$ as shown by the "X" marks, but passes the LBT 240 at the boundary of the slot $204_{(2)}$ as shown by the checkmark. After passing the LBT 240 at the boundary of the slot $204_{(2)}$, the UE transmits a UL communication signal 220a beginning at the slot boundary of the slot $204_{(2)}$. The UL communication signal 220a includes reference signals 210 at the reference signal symbols 206r and UL data 222 at the remaining symbols 206.

In another scenario 252, the UE fails the LBTs 240 in the slot $204_{(1)}$ and the LBT 240 at the slot boundary of the slot $204_{(2)}$ as shown by the "X" mark, but passes the LBT 240 at the half-slot boundary of the slot $204_{(2)}$ as shown by the checkmark. The LBT 240 at the half-slot boundary of the slot $204_{(2)}$ is a pass. After passing the LBT 240 at the half-slot boundary of the slot $204_{(2)}$, the UE transmits a UL communication signal 220b beginning at the half-slot boundary of the slot $204_{(2)}$. The UL communication signal 220b includes a reference signal 210 at the reference signal symbol 206r in the half-slot 208b of the slot $204_{(2)}$ and UL data 222 in the remaining symbols 206.

If the LBT 240 at the half-slot boundary of the slot $204_{(2)}$ fails, the UE may not transmit a UL communication signal to the BS even though the BS has scheduled the UE for a UL transmission.

The BS may perform blind detection at the reference signal symbols 206r to determine whether a reference signal 210 is received from the UE. Based on the reference signal detection, the BS can determine whether the UE did transmit the UL communication signal 220. For example, if the BS detects a reference signal 210 at the reference signal symbol 206r of the first half-slot 208a, the BS can determine that the UE uses the full slot 204 for the transmission. If the BS fails to detect a reference signal 210 at the reference signal symbol 206r of the first half-slot 208a, but detected a reference signal 210 at the reference signal symbol 206r of the second half-slot 208b, the BS can determine that the UE uses the second half-slot 208b for the transmission.

In an embodiment, upon receiving the scheduling grant, the UE may generate a transport block (TB) based on the allocated resources (e.g., in the slots $204_{(1)}$ and $204_{(2)}$). For example, the UE may perform rate-matching based on the resources in the two allocated slots $204_{(1)}$ and $204_{(2)}$. Depending on the LBT 240 outcomes, the UE may or may not transmit the entire TB as generated. If an LBT pass occur at a later time (e.g., at the half-slot boundary), the UE can puncture or drop the portion of the TB that is mapped to the symbols 206 in the first half-slot 208a and only transmit the portion of the TB that are mapped to the symbols 206 (e.g., in the second half-slot 208b) after passing the LBT 240. The use of puncturing due to a late start for the transmission can keep the UE complexity low without having the UE to re-generate the TB after passing an LBT 240.

In an embodiment, a BS may indicate to a UE whether a half-slot transmission is allowed or not via an RRC configuration. The BS may indicate a scheduling grant to the UE via downlink control information (DCI) in a PDCCH. The UE may perform one or more LBTs 240 based on the RRC configuration and scheduling grant.

While the scheme 200 allows a UL transmission to begin at a half-slot boundary, the preconfigured allowable starting positions may not be flexible and may not utilize the spectrum resource efficiently.

Accordingly, the present disclosure provides techniques to provision multiple flexible starting positions for each UL transmission based on certain rules and/or with certain signaling without significantly increasing the detection complexity at the BS.

Figure 3:
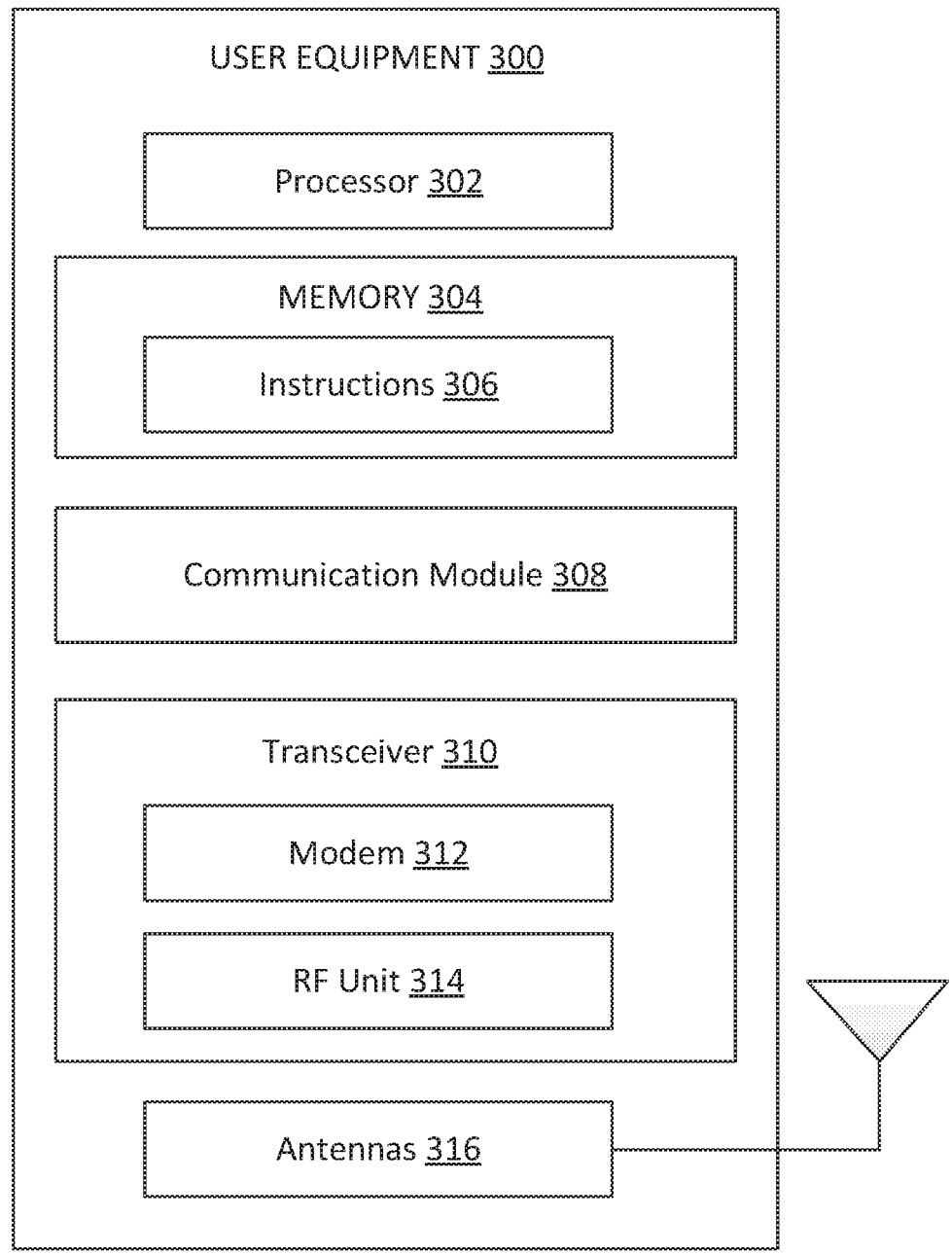
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 2, 5-16, and 18. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 308 may be implemented via hardware, software, or combination thereof. For example, the communication module 308 may be implemented as a processor, circuit, and/or instructions 306 stored in the memory 304 and executed by the processor 302. The communication module 308 may be used for various aspects of the present disclosure, for example, aspects of FIGS. 2, 5-16, and 18. For example, the communication module 308 is configured to receive from a BS (e.g., the BSs 105) reference signal configurations, scheduling grants, and/or rules for identifying flexible starting positions for UL data transmissions, performs LBTs (e.g., the LBTs 240), communicate with the BS based on the scheduling grants and the LBTs, and determine starting positions for UL data transmissions to the BS based on the rules.

The reference signal configurations may indicate locations of reference signal symbols (e.g., the reference signal symbols 206r) in a slot (e.g., the slots 204). In an embodiment, the flexible starting positions may be dependent on the locations of the reference signal symbols within a slot and/or the number of reference signal symbols within a slot. Thus, the communication module 308 is configured to determine a starting position for a UL data transmission based on the locations of the reference signal symbols within a slot and/or the number of reference signal symbols within a slot.

In an embodiment, the flexible starting positions may be any symbol within a slot. The communication module 308 is configured to transmit additional information to assist the BS in locating or detecting a UL transmission from the UE 300. For example, the communication module 308 is configured to transmit uplink control information (UCI) along with a UL data transmission to indicate information (e.g., the starting position) associated with the UL transmission. Alternatively, the communication module 308 is configured to transmit a preamble signal at the beginning of the UL transmission marking the start of the UL data transmission.

In an embodiment, the communication module 308 is configured to receive from a BS a random access configuration including multiple random access transmission opportunities beginning at different starting positions within a random access period, perform LBTs, and transmit a random access preamble signal based on multiple random access transmission opportunities and the LBTs. Mechanisms for transmitting UL data and/or random access preamble signals with multiple starting positions are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
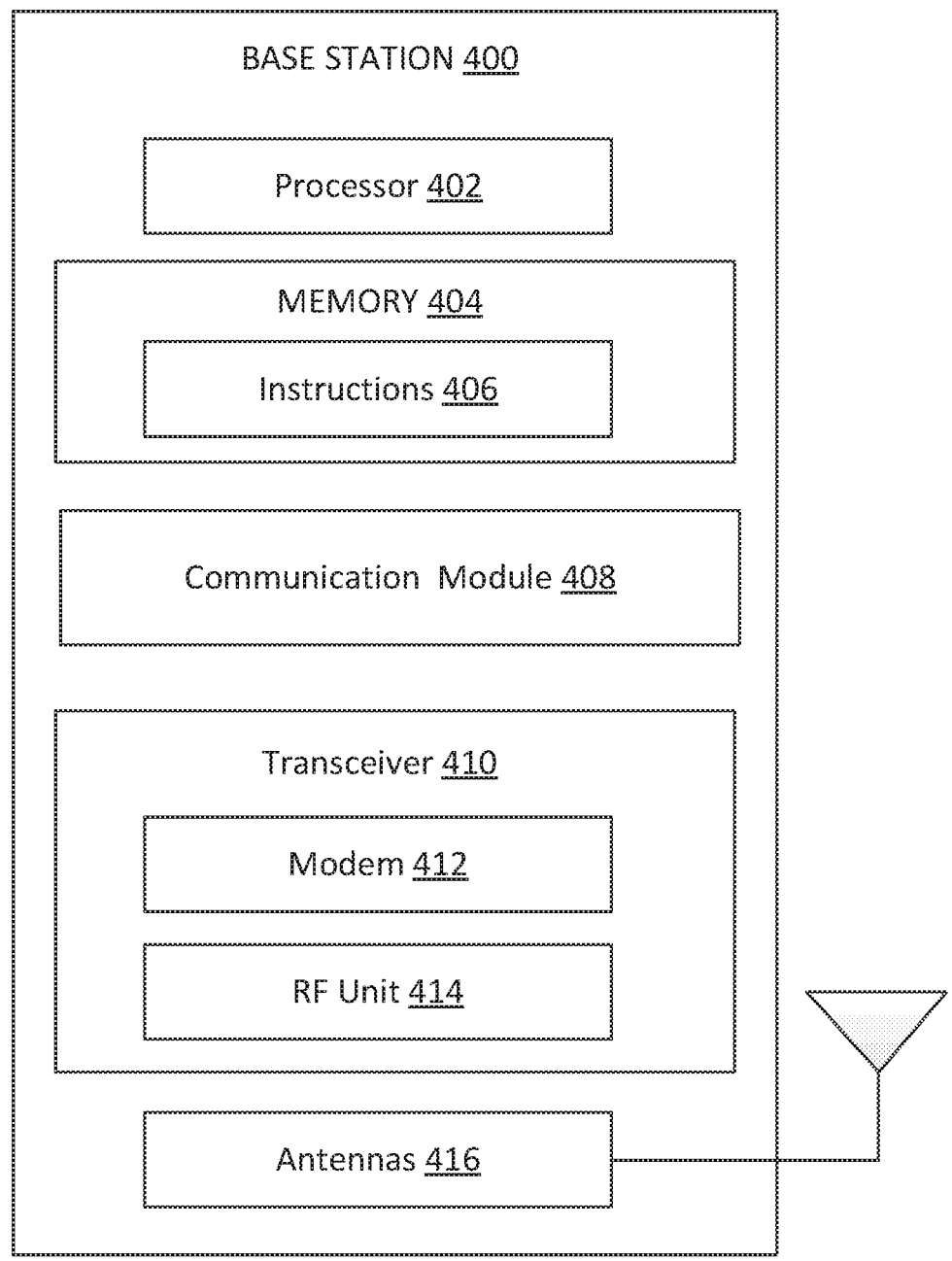
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105, 205, or 305 as discussed above in FIG. 1. A shown, the BS 400 may include a processor 402, a memory 404, a communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2, 5-15, and 17-18. Instructions 406 may also be referred to as code, which may be interpreted broadly to include any type of computer-readable statement(s) as discussed above with respect to FIG. 3.

The communication module 408 may be implemented via hardware, software, or combination thereof. For example, the communication module 408 may be implemented as a processor, circuit, and/or instructions 406 stored in the memory 404 and executed by the processor 402. The communication module 408 may be used for various aspects of the present disclosure, for example, aspects of FIGS. 2, 5-15, and 17-18. For example, the communication module 408 is configured to transmit to a UE (e.g., the UEs 115 and 300) reference signal configurations, scheduling grants, and/or rules for identifying flexible starting positions for UL data transmissions, performs LBTs, scheduling the UE based on the LBTs, monitoring for the UE's UL transmissions based on the scheduling grants, the flexile staring positions, and/or the reference signal configurations.

The reference signal configurations may indicate locations of reference signal symbols (e.g., the reference signal symbols 206r) in a slot (e.g., the slots 204). In an embodiment, the flexible starting positions may be dependent on the locations of the reference signal symbols within a slot and/or the number of reference signal symbols within a slot. Thus, the communication module 408 is configured to monitor for a reference signal from the UE at the reference signal symbols and upon a detection of a reference signal, determine a starting position for a UL data transmission based on the locations of the reference signal symbols within a slot and/or the number of reference signal symbols within a slot.

In an embodiment, the flexible starting positions may be any symbol within a slot. The communication module 408 is configured to monitor for additional information from the UE in locating or detecting a UL transmission from the UE. For example, the communication module 308 is configured to monitor for uplink control information (UCI) that is transmitted along with a UL data transmission by the UE to indicate information (e.g., the starting position) associated with the UL transmission. Alternatively, the communication module 408 is configured to monitor for aa preamble signal marking the beginning of a UL transmission from the UE.

In an embodiment, the communication module 408 is configured to transmit to a random access configuration including multiple random access transmission opportunities beginning at different starting positions within a random access period and/or monitor for a random access preamble signal from a UE based on the multiple random access transmission opportunities. Mechanisms for configuring a UE with multiple flexible starting positions for UL transmission and/or monitoring for UL data signals and/or random access preamble signals from a UE are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 400. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 400 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

FIGS. 5-8 illustrate various UL transmission mechanisms with multiple flexible starting symbol location that are defined based on reference signal symbol locations. In FIGS. 5-8, the x-axes represent time in some constant units.

Figure 5:
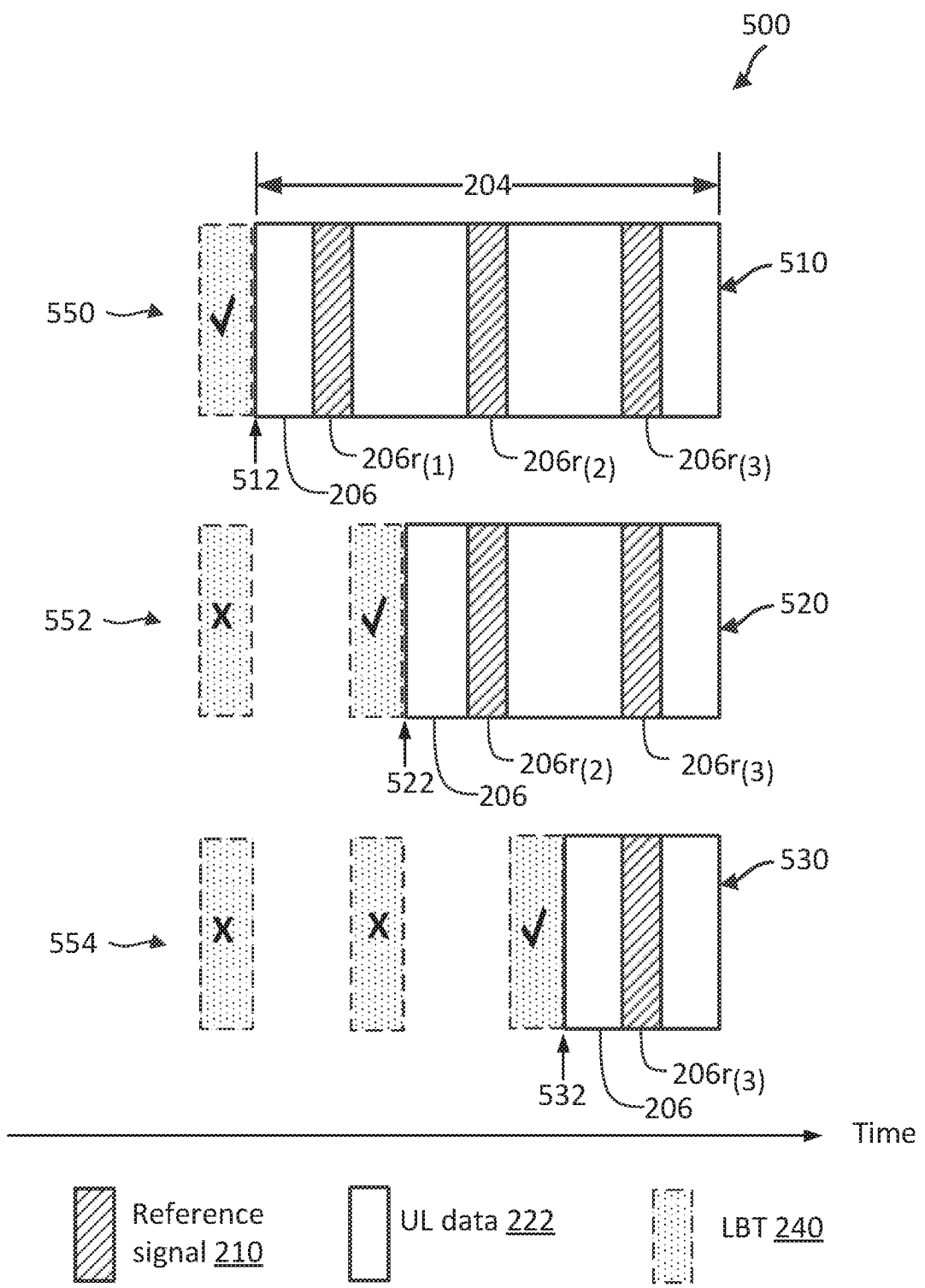
FIG. 5 illustrates a communication scheme that provisions multiple flexible transmission starting positions for an uplink (UL) transmission according to some embodiments of the present disclosure.

FIG. 5 illustrates a communication scheme 500 that provisions multiple flexible transmission starting positions for a UL transmission according to some embodiments of the present disclosure. The scheme 500 may be employed by BSs such as the BSs 105 and 400 and UEs such as the UEs 115 and 300 in a network such as the network 100. The scheme 500 is illustrated using a similar slot structure as in the scheme 200, and may use the same reference numerals as in FIG. 2 for simplicity sake. In the scheme 500, a BS may configure a set of N symbols 206 within a slot 204 for transmitting a reference signal 210, where N may be any positive integer. The BS may allow for multiple flexible UL transmission starting positions for each UL transmission. The BS may associate the flexible UL transmission starting positions with the locations of the reference signal symbols 206r.

In an embodiment, the BS may allow for M flexible UL transmission starting positions, where M is a positive integer equal to or less than N. Each flexible UL transmission starting position may be associated with one of the reference signal symbols 206r. For example, each flexible UL transmission starting position may be located at K symbol 206 before a corresponding reference signal symbol 206r, where K is a positive integer. As an example, N is about 3, M is about 3, and K is about 1. Accordingly, a first starting position 512 may start one symbol 206 prior to a first reference signal symbol $206r_{(1)}$, a second starting position 522 may start one symbol 206 prior to a second reference signal symbol $206r_{(2)}$, and a third starting position 532 may start one symbol 206 prior to a third reference signal symbol $206r_{(3)}$.

In an embodiment, the BS may configure the UE with a reference signal configuration indicating the locations of the reference signal symbols 206r in a slot 204 via an RRC configuration or any configuration message. The BS may configure the UE with a rule for identifying the multiple flexible starting positions, for example, based on a certain symbol offset (e.g., the value K) with respect to the reference signal symbols 206r. Alternatively, the BS may configure the UE with the flexible starting positions via an RRC configuration instead of a rule for identifying the flexible starting positions. The BS may grant a UE with a UL transmission in a slot 204 via a DCI indication in a PDCCH or any control message. In some embodiments, the DCI may additionally indicate reference signal locations and/or a rule to for identifying the starting positions.

The UE may perform M LBTs 240 prior to the flexible starting positions (e.g., the flexible starting positions 512, 522, and 532). In a scenario 550, the UE performs an LBT 240 prior to the first flexible staring position 512 and the LBT 240 is a pass as shown by the checkmark. Accordingly, the UE transmits a UL communication signal 510 using the full slot 204. The UL communication signal 510 includes a reference signals 210 (e.g., a DMRS) at each of the reference signal symbols $206r_{(1)}$, $206r_{(2)}$, and $206r_{(3)}$ and UL data 222 at the other symbols 206.

In another scenario 552, the UE fails an LBT 240 prior to the first flexible staring position 522 as shown by the "X" mark, but passes an LBT 240 prior to the second flexible starting position 512 as shown by the checkmark. Accordingly, the UE transmits a UL communication signal 520 beginning at the second flexible starting position 522. The UL communication signal 520 includes a reference signal 210 at each of the reference signal symbols $206r_{(2)}$ and $206r_{(3)}$ and UL data 222 at the remaining symbols 206.

In yet another scenario 554, the UE fails LBTs 240 prior to the first flexible staring position 512 and the second flexible starting position 522 as shown by the "X" marks, but passes an LBT 240 prior to the third flexible starting position 532 as shown by the checkmark. Accordingly, the UE transmits a UL communication signal 530 beginning at the third flexible starting position 532. The UL communication signal 520 includes a reference signals 210 at the reference signal symbol $206r_{(3)}$ and UL data 222 at the remaining symbols 206.

The BS may perform blind detection at the reference signal symbols $206r_{(1)}$, $206r_{(2)}$, and $206r_{(3)}$ to determine whether a reference signal 210 is received from the UE. When the BS detected a reference signal 210 at each of the reference signal symbols $206r_{(1)}$, $206r_{(2)}$, and $206r_{(3)}$, the BS may determine that the UE uses the full slot 204 for the UL transmission as shown in the scenario 550. In other words, the UE started the UL transmission at the full slot boundary. Alternatively, when the BS fails to detect a reference signal 210 at the reference signal symbol $206r_{(1)}$, but detected a reference signal 210 at each of the reference signal symbol $206r_{(2)}$ and $206r_{(3)}$, the BS may determine that the UE started the UL transmission at the starting position 522 as shown in the scenario 552 based on the association between the flexible starting position 522 and the reference signal symbol $206r_{(2)}$. Yet alternatively, when the BS detected a reference signal 210 only at the reference signal symbol $206r_{(3)}$, the BS may determine that the UE started the UL transmission at the starting position 532 as shown in the scenario 554 based on the association between the flexible starting position 532 and the reference signal symbol $206r_{(3)}$.

As can be seen, the BS may receive at least one reference signal 210 for each UL transmission. Accordingly, the BS may determine a channel estimate based on one or more received reference signals 210 and recover the UL data 222 based on the channel estimate.

Figure 6:
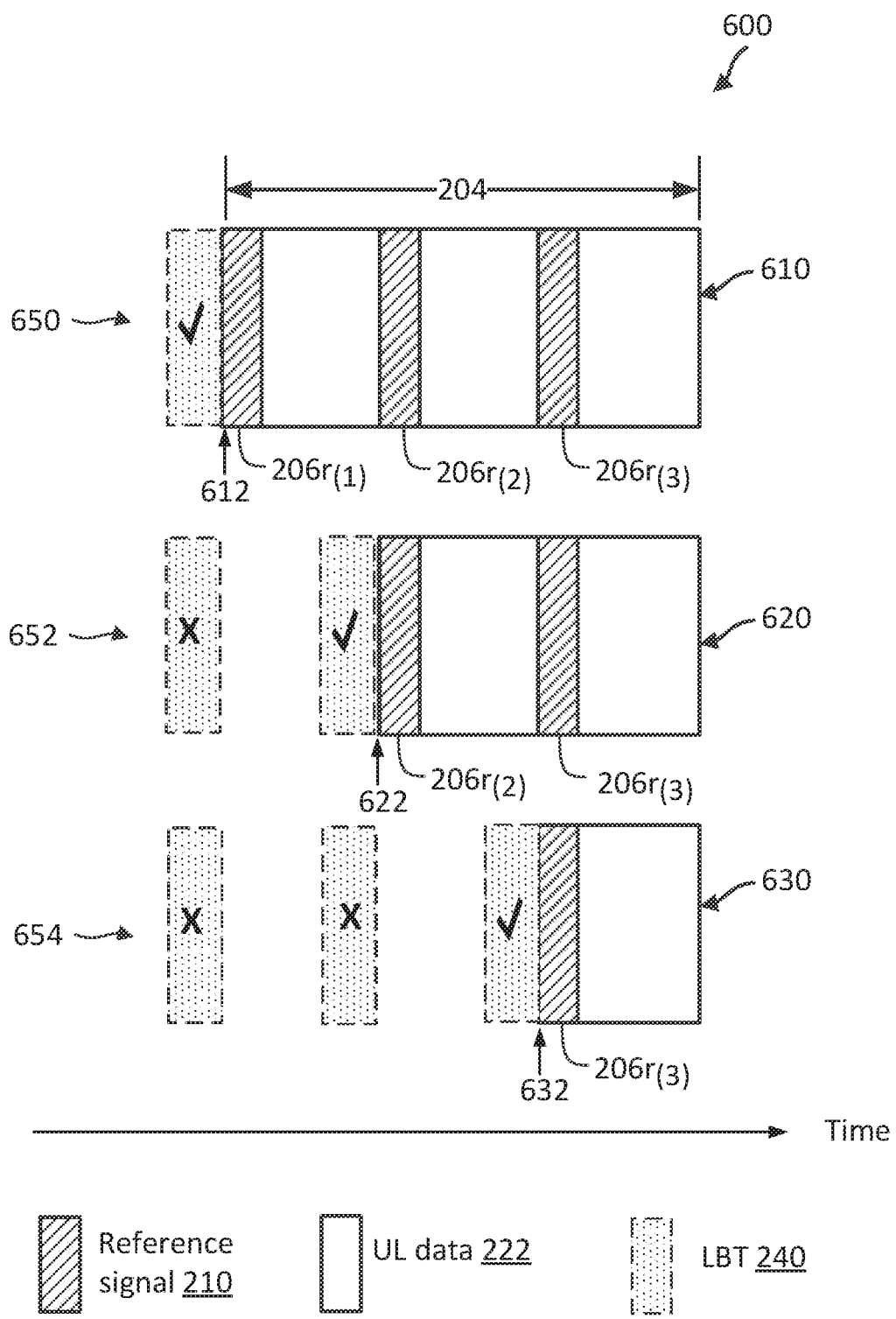
FIG. 6 illustrates a communication scheme that provisions multiple flexible transmission starting positions for a UL transmission according to some embodiments of the present disclosure.

FIG. 6 illustrates a communication scheme 600 that provisions multiple flexible transmission starting positions for a UL transmission according to some embodiments of the present disclosure. The scheme 600 may be employed by BSs such as the BSs 105 and 400 and UEs such as the UEs 115 and 300 in a network such as the network 100. The scheme 600 is illustrated using a similar slot structure as in the scheme 200, and may use the same reference numerals as in FIG. 2 for simplicity sake. The scheme 600 is substantially similar to the scheme 500. For example, in the scheme 600, a BS may configure N symbols 206 within a slot 204 for transmitting a reference signal 210 and may allow M flexible UL transmission staring positions for each UL transmission based on an association with the reference signal symbols 206r. However, in the scheme 600, each flexible starting position is time-aligned to one of the reference signal symbols 206r. In other words, the scheme 600 uses a frontloaded reference signal (e.g., a frontloaded DMRS) for UL transmissions. As shown, a first starting position 612 is time-aligned to a first reference signal symbol $206r_{(1)}$, a second starting position 622 is time-aligned to a second reference signal symbol $206r_{(2)}$, and a third starting position 632 is time-aligned to a third reference signal symbol $206r_{(3)}$.

Similar to the scheme 500, the BS may configure a UE with a reference signal configuration indicating the locations of the reference signal symbols 206r in a slot 204 via an RRC configuration or any configuration message. The BS may configure the UE with multiple flexible starting positions corresponding to the locations of the reference signal symbols $206r_{(1)}$, $206r_{(2)}$, and $206r_{(3)}$ or a mapping between the flexible starting positions and the reference signal symbols 206r.

In a scenario 650, the UE passes an LBT 240 prior to the first flexible staring position 612 as shown by the checkmark and transmits a UL communication signal 610 (e.g., the UL communication signal 510) using the full slot 204.

In another scenario 652, the UE fails an LBT 240 prior to the first flexible staring position 612 as shown by the "X" mark, but passes an LBT 240 prior to the second flexible starting position 622 as shown by the checkmark. Accordingly, the UE transmits a UL communication signal 620 (e.g., the UL communication signal 520) beginning at the second flexible starting position 622.

In yet another scenario 654, the UE fails LBTs 240 prior to the first flexible staring position 612 and the second flexible starting position 622 as shown by the "X" marks, but passes an LBT 240 prior to the third flexible starting position 632 as shown by the checkmark. Accordingly, the UE transmits a UL communication signal 630 (e.g., the UL communication signal 530) beginning at the third flexible starting position 632.

While FIG. 6 illustrates the first reference signal symbol $206r_{(1)}$ to be located at the slot boundary of the slot 204, in some embodiments, the first reference signal symbol $206r_{(1)}$ can be located at the second or third symbol 206 of the slot 204. In such embodiments, the first starting position may still be kept at the slot boundary (e.g., the starting position 612), but subsequent starting positions may begin at the reference signal symbols $206r_{(2)}$ and $206r_{(3)}$.

In another embodiment, a BS may convey multiple flexible starting positions for a UL transmission through a number of reference signal symbols 206r within a slot 204 in addition to the locations of the reference signal symbols 206r.

In general, the flexible starting positions (e.g., the flexible starting positions 512, 522, 532. 612. 622, and 632) can be any symbol 206 before a reference signal symbol 206r, for example, with a fixed offset to a reference signal symbol 206r, as in the scheme 500 or time-aligned to a reference signal symbol 206r as in the scheme 600. A UE (e.g., the UEs 115 and 300) may identify the flexible starting positions based on an association rule. The UE may select a starting position from among the flexible starting positions based on LBTs (e.g., the LBTs 240). A BS (e.g., the BSs 105 and 400) may monitor for a UL transmission from a UE based on a blind detection for a reference signal 210 at reference signal symbols 206r. Upon a detection of a reference signal 210, the BS may determine a starting position of the UL transmission based on the association rule.

Figure 7:
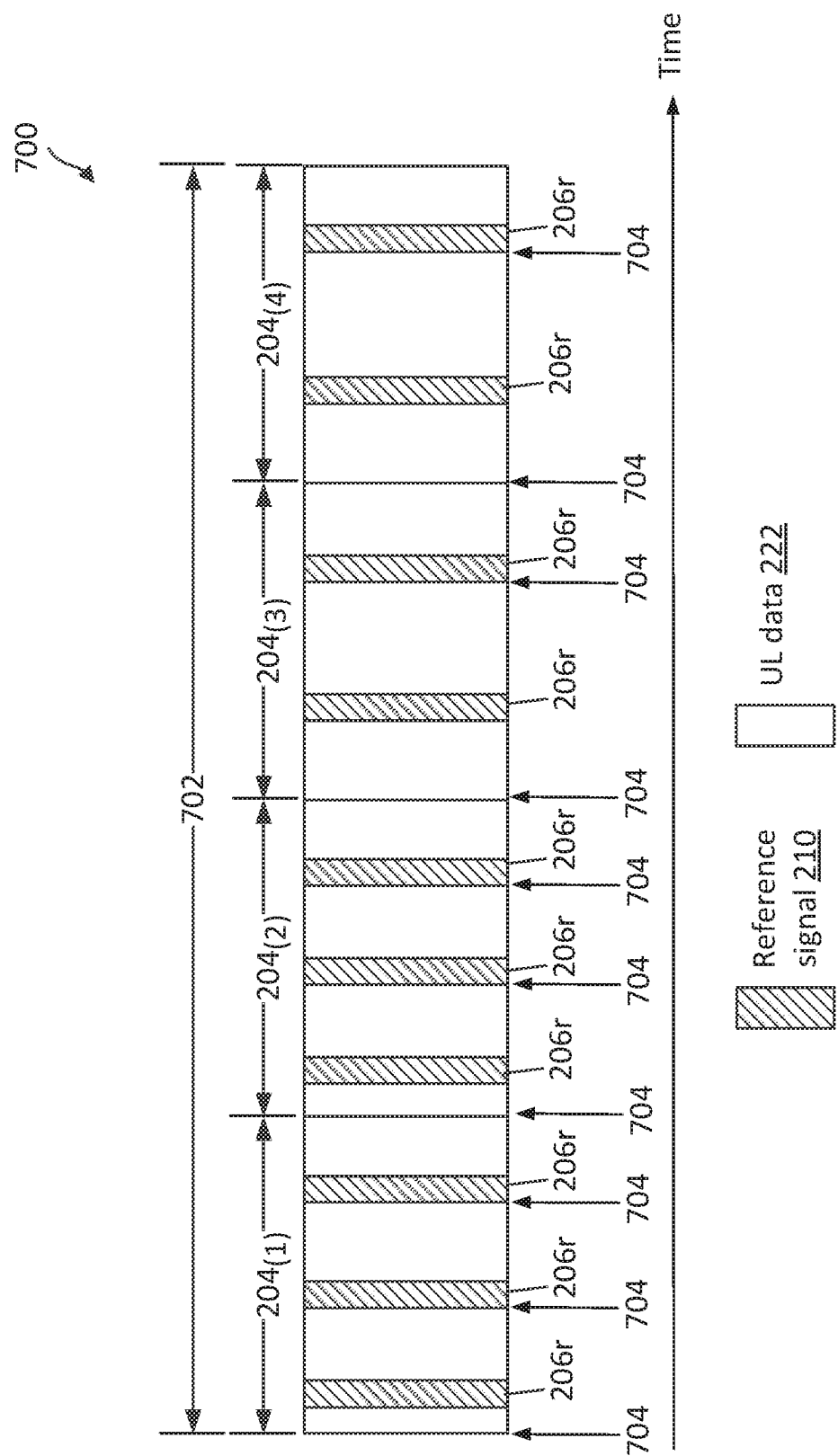
FIG. 7 illustrates a reference signal configuration with a varying time-density according to some embodiments of the present disclosure.

FIG. 7 illustrates a reference signal configuration 700 with a varying time-density according to some embodiments of the present disclosure. The configuration 700 may be employed by BSs such as the BSs 105 and 400 and UEs such as the UEs 115 and 300 in a network such as the network 100. The configuration 700 is illustrated using a similar slot structure as in the scheme 200, and may use the same reference numerals as in FIG. 2 for simplicity sake. The reference signal configuration 700 can be used in conjunction with the schemes 500 and 600. The configuration 700 includes reference signal symbols 206r distributed across multiple slots 204 in a UL burst 702 (e.g., a UL portion of a TXOP) with a varying time-density. The BS may configure a high reference signal symbol 206r density at the beginning of the UL burst 702. The high reference signal symbol 206r density allows for more UL transmission starting opportunities at the beginning of the UL burst 702 (e.g., in the slots $204_{(1)}$ and $204_{(2)}$). The reference signal symbols 206r can have a lower time-density in later time of the UL burst 702 (e.g., in the slots $204_{(3)}$ and $204_{(4)}$). For simplicity of illustration and discussion, FIG. 7 illustrates the possible UL transmission starting positions 704 aligned to the slot boundaries and to the reference signal symbols 204r. However, the UL transmission starting positions 704 may be alternatively configured to be at any suitable offsets from the reference signal symbols 204r to achieve similar functionalities.

The decreasing reference signal symbol 206r density is based on the assumption that more UL transmission starting opportunities may be required at the beginning of a TXOP or UL burst and less UL transmission starting opportunities may be required at a later time in the TXOP or the UL burst. In effect, the configuration 700 controls the density of possible UL transmission starting positions.

The use of a decreasing reference signal symbol 206r density can allow for more UL transmission opportunities at the beginning of an allocation (e.g., the UL burst 702) where a UE may be contending for a TXOP, but without increasing the overhead associated with reference signal transmissions across all slots 204. For example, a BS may not require all the reference signals for channel estimation at a later time in the allocation when the Doppler for the channel is low.

Figure 8:
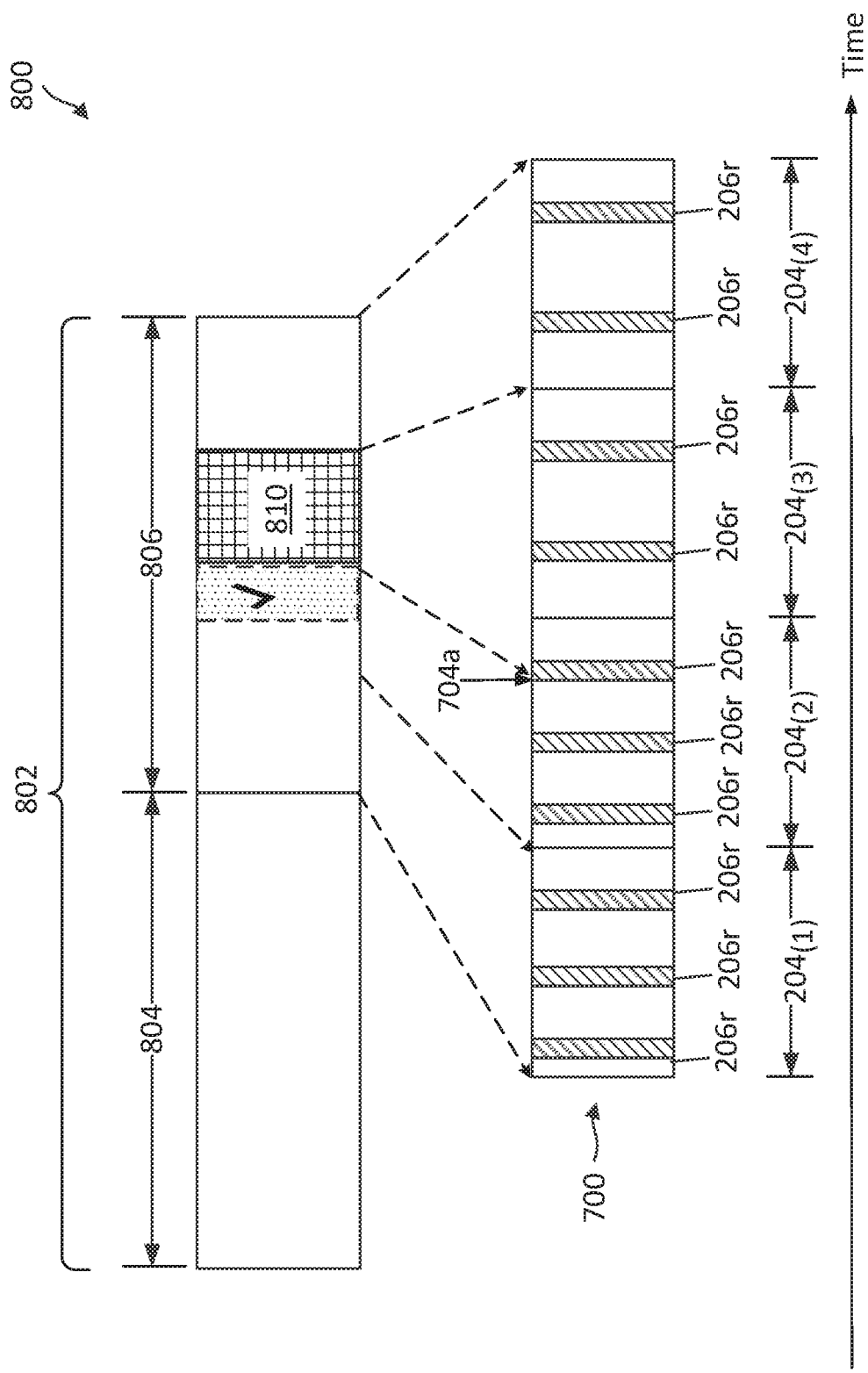
FIG. 8 illustrates a communication scheme that provisions multiple flexible transmission starting positions for a UL transmission according to some embodiments of the present disclosure.

FIG. 8 illustrates a communication scheme 800 that provisions multiple flexible transmission starting positions for a UL transmission according to some embodiments of the present disclosure. The scheme 800 may be employed by BSs such as the BSs 105 and 400 and UEs such as the UEs 115 and 300 in a network such as the network 100. The scheme 800 is illustrated using a similar slot structure as in the scheme 200, and may use the same reference numerals as in FIG. 2 for simplicity sake. In the scheme 800, a BS applies the configuration 700 to configure reference signal symbols 206r with varying time-density. The BS may configure a UE with the configuration 700 via an RRC configuration. Similar to the schemes 500 and 600, the BS may configure the UE with multiple flexible starting positions for each UL transmission in association with the reference signal symbols 206r by providing the UE with an association rule or an indication of the locations of the reference signal symbols 206r.

In the scheme 800, a TXOP 802 includes a DL portion 804 and a UL portion 806. The configuration 700 is applied to the UL portion 806 of the TXOP 802. As an example, a BS may schedule a UE for a UL transmission in the slots $204_{(2)}$ and $204_{(3)}$. When the UE receives the grant, the UE may determine a slot location of the granted slot $204_{(2)}$ and $204_{(3)}$ within the UL portion 806. The UE may determine corresponding reference signal symbols 206r within the granted slots $204_{(2)}$ and $204_{(3)}$ based on the configuration 700. After determining the reference signal symbols 206r locations within the granted slots $204_{(2)}$ and $204_{(3)}$, the UE may employ similar mechanisms as in the schemes 500 and 600 to perform LBTs 240 and determine a starting position for transmitting a UL communication signal 810 (e.g., the UL communication signals 510, 520, 530, 610, 620, and 630) to the BS during the granted slots 204. For example, the UE passes an LBT 240 before the last reference signal symbol 206r in the slot $204_{(2)}$ begin, and thus begin the transmission of the UL communication signal 810 beginning at the starting position 704a.

In an embodiment, the BS may configure the UE with the configuration 700 via an RRC configuration. For example, the BS may indicate that a first time-density for the reference signal symbols 206r in the first two slots $204_{(1)}$ and $204_{(2)}$ and a second time-density for the reference signal symbols 206r in the next two slots $204_{(3)}$ and $204_{(4)}$. The BS may transmit a UL grant via a DCI to the UE indicating the slots $204_{(2)}$ and $204_{(3)}$ in the TXOP 802 allocated to the UE. The UE may determine where the UL slots 204 (e.g., the UL portion 806) are located in the TXOP 802 via a slot format indicator (SFI) received in a common-PDCCH (C-PDCCH). In the context of NR, SFI can indicate whether a slot 204 is designated for UL, DL, or flexible communication direction and the C-PDCCH is a common search space for all UEs connected to the BS. After determining the locations of the UL slots 204 in the TXOP 802, the UE can determine the locations of the granted slots $204_{(2)}$ and $204_{(3)}$ within the UL slots 204 of the TXOP 802. The UE can determine the locations of the reference signal symbols 206r in the granted slots $204_{(2)}$ and $204_{(3)}$ by matching the locations of the granted slots $204_{(2)}$ and $204_{(3)}$ within the UL slots 204 of the TXOP 802 to the configuration 700.

In an embodiment, the BS may transmit a UL grant via a DCI to the UE indicating the slots $204_{(2)}$ and $204_{(3)}$ in the TXOP 802 allocated to the UE. The BS may indicate the reference signal symbol time-density along with the UL grant in the DCI. For example, the BS may allocate L slots 204 for the UE and may indicate that the first P slots 204 have a high reference signal symbols 206r time-density and remaining slots 204 have a low reference signal symbols 206r time-density, where L and P are positive integers.

In an embodiment, the BS may configure the UE with a set of reference signal symbols 206r having a certain time-density via an RRC configuration and may indicate a change in the reference signal symbols 206r time-density via the DCI. Alternatively, the BS indicate the reference signal symbols 206r time-density (e.g., for example the P value) within the UL grant.

In general, the UE may identify UL transmission starting positions through RRC configurations, C-PDCCH/SFI, DCI, and/or UL grants.

The schemes 500, 600, and 800 described above with respect to FIGS. 5, 6, and 8, respectively, associate allowable UL transmissions starting positions with the locations of the reference signal symbols 206r within a slot 204. In another embodiment, a BS may convey multiple flexible starting positions for a UL transmission through a number of reference signal symbols 206r within a slot 204 in addition to the locations of the reference signal symbols 206r.

FIGS. 9-10 illustrates various UL transmission mechanisms where a UL transmission may start at any symbol locations within an allocation. In FIGS. 9-10, the x-axes represent time in some constant units.

FIG. 9 illustrates a communication scheme 900 that provisions multiple flexible transmission starting positions for a UL transmission according to some embodiments of the present disclosure. The scheme 900 may be employed by BSs such as the BSs 105 and 400 and UEs such as the UEs 115 and 300 in a network such as the network 100. The scheme 900 is illustrated using a similar slot structure as in the scheme 200, and may use the same reference numerals as in FIG. 2 for simplicity sake. The scheme 900 allows a UL transmission to start at any symbol location within an allocated slot instead of defined based on reference signal symbol locations. For example, a BS may allocate multiple slots 204 (e.g., a first slot $204_{(1)}$ and a second slot $204_{(2)}$) for a UE to transmit a UL communication signal 910. Instead of introducing a high reference signal symbol overhead with the high time-density in the allocated slots 204, where a late UL transmission start will cause reference signal symbols to be dropped or punctured, the UE can start to transmit the UL communication signal 910 at any symbol location.

However, in some instances, the UE may not be able to start until after the last reference signal symbol 206r in the first slot $204_{(1)}$, for example, gated by LBTs (e.g., the LBT 240). In an example the UE transmits a UL communication signal 910 beginning at a starting position 912 (e.g., after passing an LBT) in the first slot $204_{(1)}$ and continue into the second slot $204_{(2)}$. This starting position 912 is after a last reference signal symbol 206r in the first slot $204_{(1)}$. The UL communication signal 910 includes UL data 222 in the first slot $204_{(1)}$ and the second slot $204_{(2)}$. However, the UL communication signal includes a reference signal 210 in the second slot $204_{(2)}$, but not in the first slot $204_{(1)}$. In such an example, the BS may use the reference signal 210 received in a next slot $204_{(2)}$ for channel estimation and recovery of UL data 222 transmitted in the first slot $204_{(1)}$ and the second slot $204_{(2)}$.

It should be noted that the use of a reference signal 210 received in a next slot $204_{(2)}$ for data decoding in a current slot $204_{(1)}$ requires the same precoding or transmission rank to be used for transmissions in both slots $204_{(1)}$ and $204_{(2)}$ and the UE to maintain a phase continuity for the transmissions across the slots $204_{(1)}$ and $204_{(2)}$.

To assist the BS in locating or detecting the start of the UL communication signal 910, the UE can transmit uplink control information (UCI) 914 indicating the transmission of the UL communication signal 910 in the slot $204_{(1)}$. The UCI 914 can include an indication of the starting position 912 of the UL communication signal 910. The UE may transmit the UCI 914 during the slot $204_{(2)}$. For example, the BS may configure a resource for UCI transmission in each slot 204. The UCI resource may be located in any suitable location within a slot 204. The BS may monitor for a UCI from the UE. Upon detecting the UCI 914, the BS may know the start of the UL communication signal 910. The UE may receive the UL communication signal 910 according to the UCI 914. The BS may determine a channel estimate based on the reference signal 210 received in the second slot $204_{(2)}$. The BS may decode the UL data 222 from the UL communication signal 910 received in the first slot $204_{(1)}$ and in the second slot $204_{(2)}$ based on the channel estimate.

FIG. 10 illustrates a communication scheme 1000 that provisions multiple flexible transmission starting positions for a UL transmission according to some embodiments of the present disclosure. The scheme 1000 may be employed by BSs such as the BSs 105 and 400 and UEs such as the UEs 115 and 300 in a network such as the network 100. The scheme 1000 is illustrated using a similar slot structure as in the scheme 200, and may use the same reference numerals as in FIG. 2 for simplicity sake. Similar to the scheme 900, the scheme 1000 allows a UL transmission to start at any symbol locations within an allocated slot instead of limited by the reference signal symbol locations. However, the scheme 1000 utilizes a preamble signal to indicate the start of a UL transmission signal instead of the UCI 914 as in the scheme 900. The scheme 1000 is described using the same slot configuration, the same reference signal configuration, and the same UL allocation as in the scheme 900.

As shown, the UE transmits a UL communication signal 1010 beginning at the starting position 1012, for example, based on an LBT pass. To assist the BS in locating or detecting the start of the UL communication signal 1010, the UE includes a preamble signal 1014 at the beginning of the UL communication signal 1010. The preamble signal 1014 may include one or more predetermined frequency tones. Alternatively, the preamble signal 1010 may include a predetermined sequence. The preamble signal 1014 functions as a wakeup signal to mark the start of the UL communication signal 1010. Accordingly, the BS may determine when the UE starts a UL transmission by monitoring for the preamble signal 1014 in the first slot $204_{(1)}$ and/or the second slot $204_{(2)}$. In some examples, the BS may configure a plurality of preamble signal transmission opportunities and the UE may begin a UL transmission using one of the preamble signal transmission opportunities. In such examples, the BS may monitor for a UL transmission from the UE at the configured preamble transmission opportunities.

In some embodiments, the preamble signal 1014 may include the same signal sequence irrespective of when the UE starts a UL transmission. In some embodiments, the preamble signal 1014 may include a time-dependent signal sequence, for example, based on the start time of a UL transmission. For example, different signal sequences may be used for different portions of a slot 204.

In an embodiment, the preamble signal 1014 includes a wideband signal pattern or signal structure similar to the reference signal 210 (e.g., including a DMRS pattern). In such an embodiment, the preamble signal 1010 can be used for channel estimation by the BS in addition to marking the start of the UL communication signal 1010. To avoid a high preamble overhead, the signal sequence or DMRS pattern for the preamble signal 1014 can be transmitted using all antenna ports on the same symbol (e.g., the symbols 206) even when the configured reference signal 210 uses different symbols for different antenna ports, for example, to support MIMO transmissions. In an example, the reference signal 210 may include a DMRS pattern transmitted by antenna ports 1 and 2 on one symbol and by antenna ports 3 and 4 on another symbol. Since the DMRS pattern includes a scrambling sequence that is dependent on the symbol 206 index, the preamble signal 1014 can include a signal sequence (e.g., a DMRS pattern) that is dependent on the symbol 206 index. In some embodiments, the UE may pre-generate different DMRS patterns for different symbol time or different portions of a slot 204 based on allowable starting positions. Upon passing an LBT, the UE may use a DMRS pattern corresponding to a start time of the UL communication signal 1010 for the preamble signal 1014.

While the schemes 1000 can provide a greater flexibility or opportunities for a UE to select a starting position within an allocated time period, a BS is required to monitor for a preamble signal 1014, a DMRS pattern, or a reference signal 210 in a full slot 204.

Figure 11:
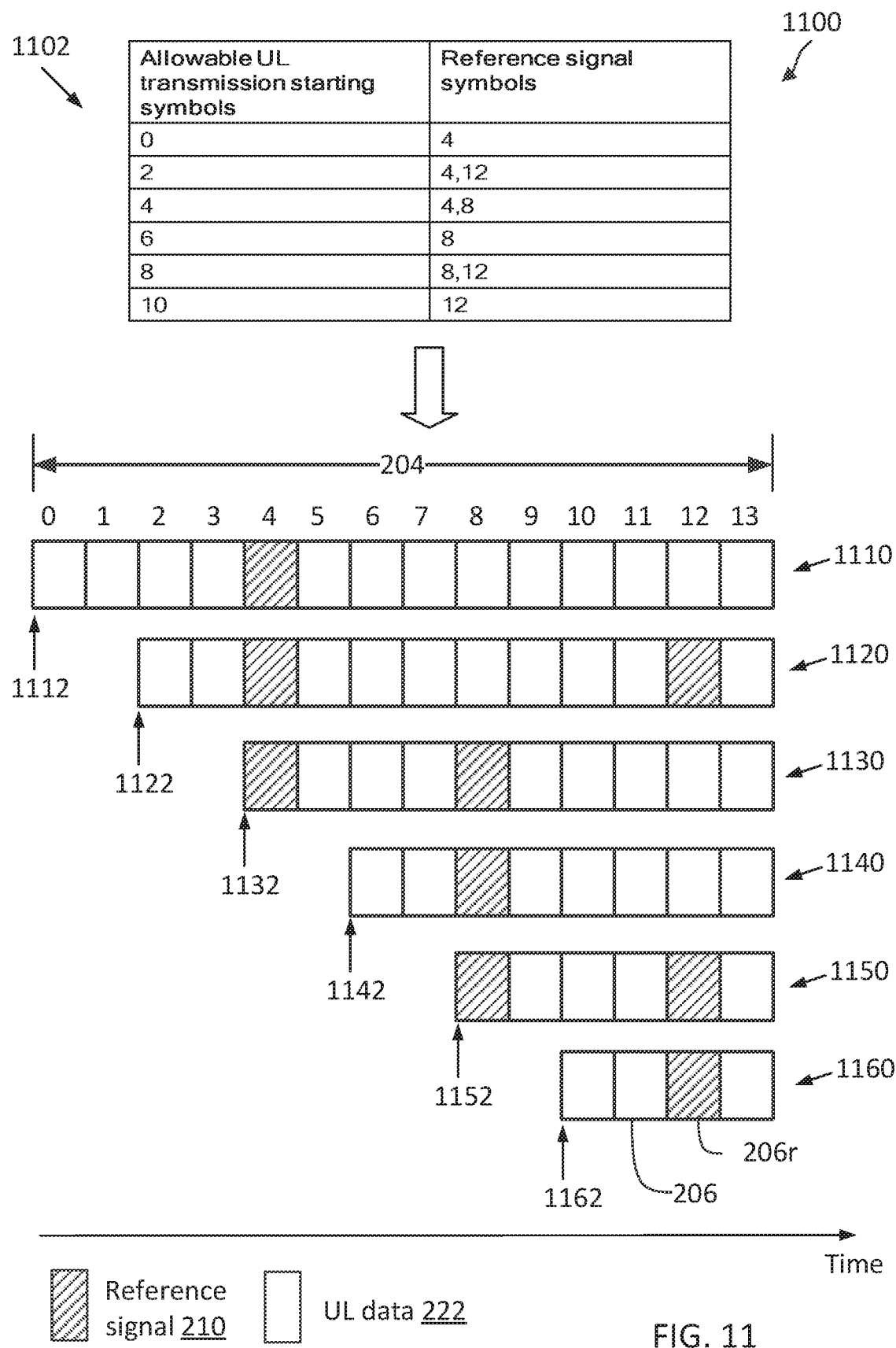
FIG. 11 illustrates a communication scheme that provisions multiple flexible transmission starting positions for a UL transmission according to some embodiments of the present disclosure.

FIG. 11 illustrates a communication scheme 1100 that provisions multiple flexible transmission starting positions for a UL transmission according to some embodiments of the present disclosure. The scheme 1100 may be employed by BSs such as the BSs 105 and 400 and UEs such as the UEs 115 and 300 in a network such as the network 100. The scheme 1100 defines flexible starting positions based on locations of reference signal symbols (e.g., the reference signal symbols 206*r*) within a slot (e.g., the slots 204) and the number of reference signal symbols within a slot to provide a greater number of starting positions without increasing the reference signal symbol time-density or search complexity at a BS.

As an example, a slot 204 may include about 14 symbols 206 indexed 0 to 13. ABS assigns a set of symbols 206 as potential reference signal symbols, for example, including symbols 206 indexed 4, 8, and 12. The BS defines a plurality of allowable UL transmission starting positions in the slot 204 based on potential locations of reference signal symbols 206*r* within the slot 204 and the number of reference signal symbols 206*r* within the slot 204. A configuration including three potential reference signal symbols 206 in a slot 204, can allow up to about six UL transmission starting positions in the slot 204. For example, the six UL transmission starting positions may include symbols 206 indexed 0, 2, 4, 6, 8, 10, and 12 as shown by the starting positions 1112, 1122, 1132, 1142, 1152, and 1162, respectively. Table 1102 illustrates an example association between the allowable UL transmission starting positions 1112, 1122, 1132, 1142, 1152, and 1162 and corresponding reference signal symbols 206*r*.

According to the table 1102, a UL communication signal 1110 beginning at symbol 206 indexed 0 (e.g., a starting position 1112) includes one reference signal 210 at symbol indexed 4. A UL communication signal 1120 beginning at symbol 206 indexed 2 (e.g., a starting position 1122) includes two reference signals 210 at symbols indexed 4 and 12. A UL communication signal 1130 beginning at symbol 206 indexed 4 (e.g., a starting position 1132) includes two reference signals 210 at symbols indexed 4 and 8. A UL communication signal 1140 beginning at symbol 206 indexed 6 (e.g., a starting position 1142) includes one reference signal 210 at symbol indexed 8. A UL communication signal 1150 beginning at symbol 206 indexed 8 (e.g., a starting position 1152) includes two reference signals 210 at symbols indexed 8 and 12. A UL communication signal 1160 beginning at symbol 206 indexed 10 (e.g., a starting position 1162) includes one reference signal 210 at symbol indexed 12.

In an embodiment, the BS may configure a UE with a lookup table (LUT) similar to the table 1102 and may grant the UE a UL transmission in the slot 204. The UE may perform an LBT (e.g., the LBT 240). Upon a successful LBT, the UE may select a starting position for transmitting a UL communication signal to the BS in the slot 204 based on the LUT. The BS may perform blind detection for a reference signal 210 in the set of potential reference signal symbols 206 (e.g., indexed 4, 8, and 12). Based on the number of reference signals 210 detected and the locations of the detected reference signals 210, the BS can determine the starting position of the UL transmission from the UE.

Figure 12:
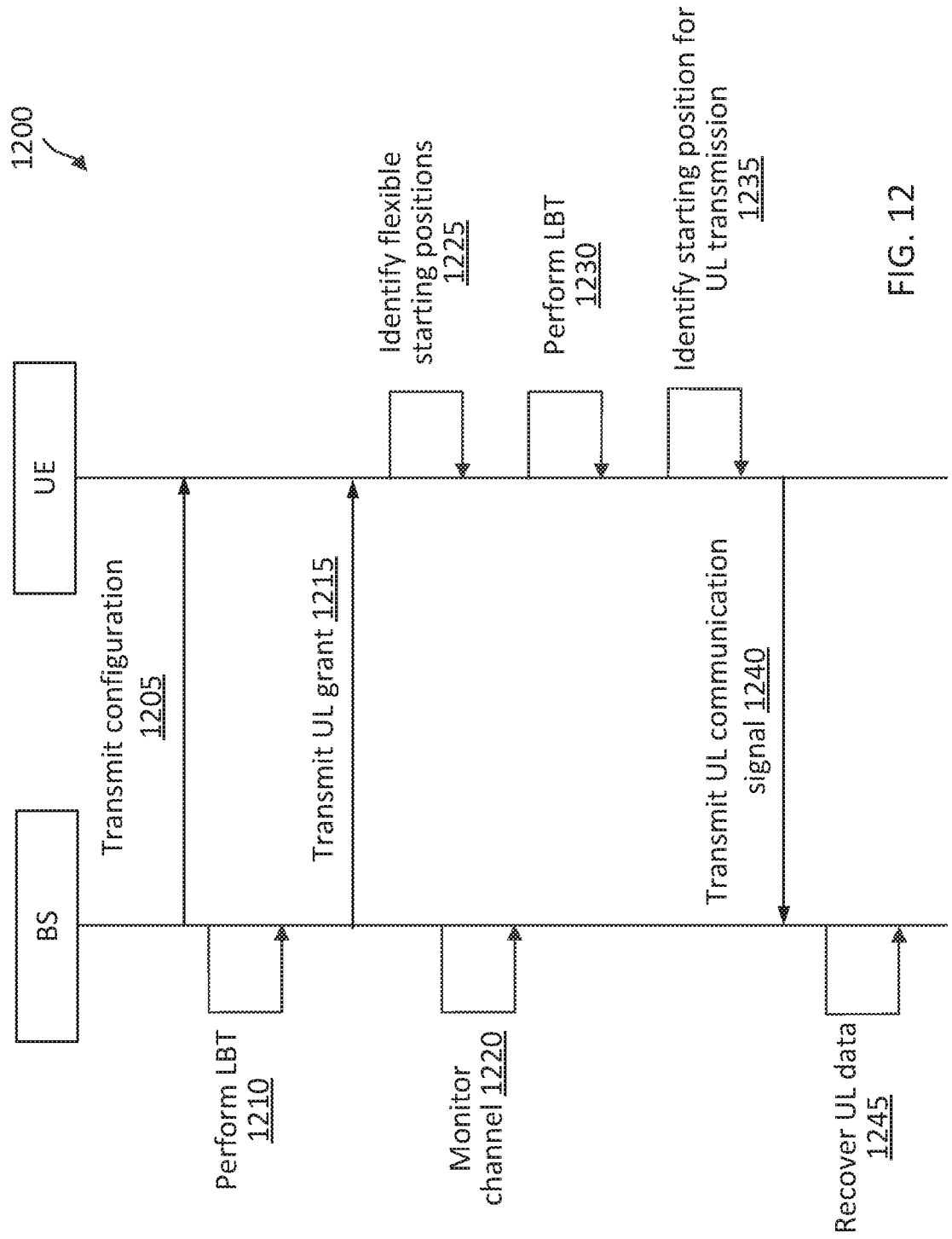
FIG. 12 is a signaling diagram illustrating a communication method according to some embodiments of the present disclosure.

FIG. 12 is a signaling diagram illustrating a UL communication method 1200 according to some embodiments of the present disclosure. The method 1200 is implemented by a BS (e.g., the BSs 105 and 400) and a UE (e.g., the UEs 115 and 300) in a network (e.g., the network 100). The method 1200 may use similar mechanisms as in the schemes 500, 600, 800, 900, 1000, and 1100 and the configuration 700 described above with respect to FIGS. 5, 6, 8, 9, 10, 11, and 7, respectively. Steps of the method 1200 can be executed by computing devices (e.g., a processor, processing circuit, and/or other suitable component) of the BS and the UE. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1205, the BS transmits a configuration to the UE. The configuration may indicate information associated with reference signal symbols (e.g., the reference signal symbols 206*r*), such as the locations of the reference signal symbols within a slot (e.g., the slots 204) and/or the time-density of the reference signal symbols (e.g., similar to the configuration 700). The configuration may indicate a rule for identifying allowable UL transmission starting positions (e.g., the starting positions 512, 522, 532, 612, 622, 632, 704*a*, 912, 1012, 1112, 1122, 1132, 1142, 1152, and 1162) within a slot. The rules can include an association (e.g., an offset) between the locations of the reference signal symbols and the UL transmission starting positions as shown in the schemes 500, 600, and 800. The rules can include a LUT (e.g., the table 1102) defining UL transmission starting positions based on reference signal symbol locations and the number of reference signal symbols within a slot. The rules can indicate that a UL transmission can start at any locations within a slot, but may be required to include UCI (e.g., the UCI 914) or a preamble signal (e.g., the preamble signal 1014) to indicate the start of the UL transmission as shown in the schemes 900 and 1000, respectively. The rules can indicate a signal sequence pattern (e.g., a wideband DMRS pattern) to be used for the preamble signal, where the signal sequence pattern may be time-dependent. The BS may transmit the configuration via an RRC configuration message and/or a DCI message.

At step 1210, the BS performs an LBT (e.g., the LBT 240). When the LBT passes, the BS gains a TXOP (e.g., the TXOP 802) in the channel and schedule the UE for a UL transmission in one or more slots within the TXOP.

At step 1215, the BS transmits a UL grant to the UE. The UL grant may indicate the allocated slots within the TXOP and/or other transmission configuration parameters (e.g., MCS code rate, precoding, and/or transmission rank). The grant may also include information about the reference signal location and/or start location configuration.

At step 1225, the UE identifies flexible or allowable UL transmission starting positions based on the configuration (e.g., the reference signal symbol configuration, the LUT, and/or the rules).

At step 1230, the UE performs an LBT, for example, based on the allowable UL transmission starting positions.

At step 1235, the UE identifies a starting position upon pass an LBT.

At step 1240, the UE transmits a UL communication signal to the BS in the one or more allocated slots beginning at the identified starting position. The UL communication signal may be similar to the UL communication signals 510, 520, 530, 610, 620, 630, 810, 910, 1010, 1110, 1120, 1130, 1140, 1150, and 1160. The UL communication signal can include one or more reference signals (e.g., the reference signals 210) at corresponding reference signal symbols and may include UL data (e.g., the UL data 222) at remaining symbols. In some embodiments, the UL communication signal can include UCI (e.g., the UCI 914) indicating information associated with the UL transmission or a preamble signal (e.g., the preamble signal 1014) marking the start of the UL transmission.

At step 1220, the BS monitors for a UL communication signal from the UE based on the UL grant. Depending on the configured rules, the BS may perform blind detection at the configured reference signal symbols or potential reference signal symbols and the configured rules. The BS can determine the start of a UL communication signal based on the reference signal detection. Alternatively, the BS can monitor for UCI and/or a preamble signal to determine whether the UE transmitted a UL communication signal and/or when the UE begins the transmission.

At step 1245, the BS recovers UL data from the received UL communication signal. The BS may estimate a channel response from one or more reference signals received from one or more slots. The BS may perform demodulation and/or decoding based on the channel estimate to recover the UL data.

Figure 13:
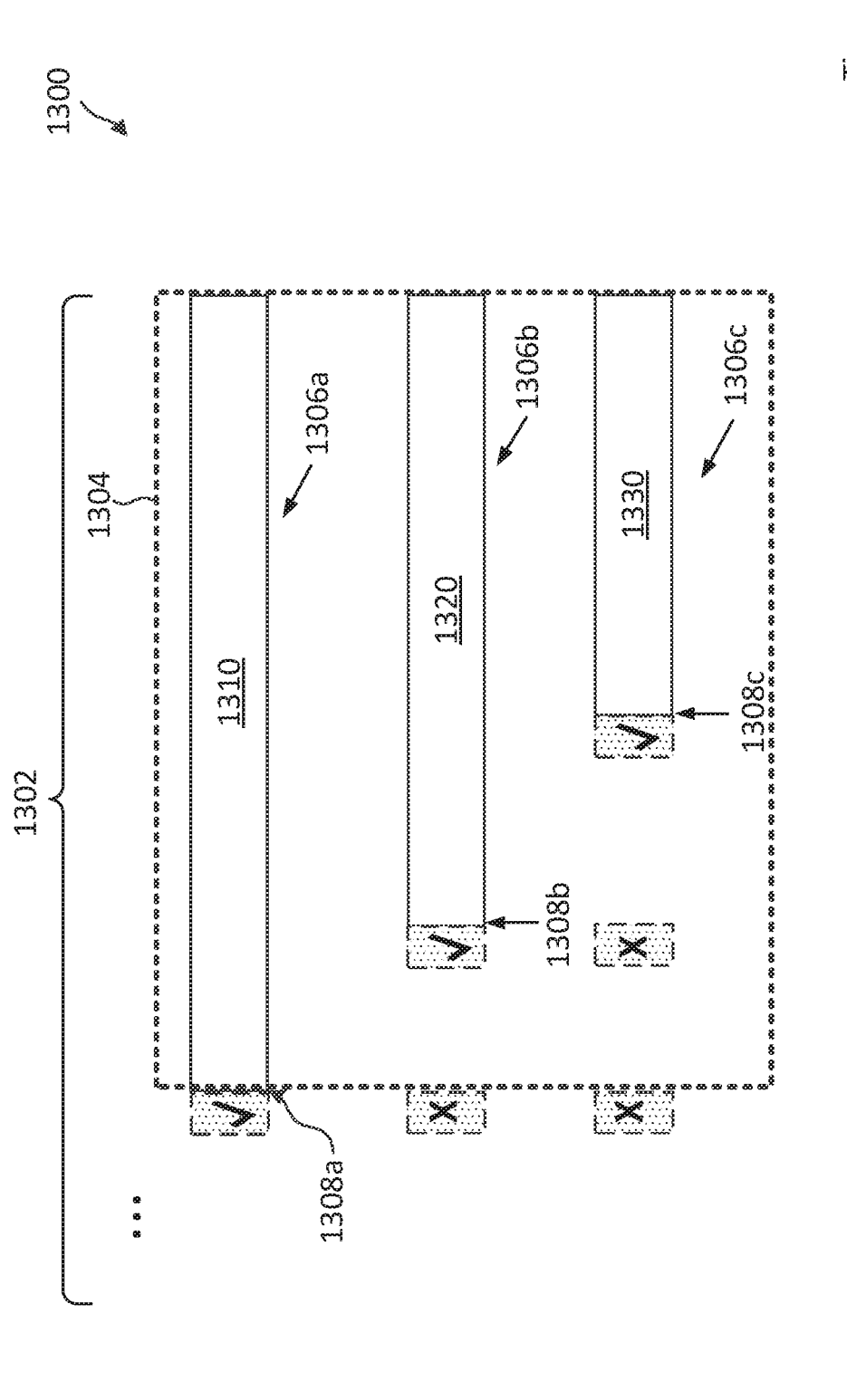
FIG. 13 illustrates a random access preamble transmission scheme that provisions multiple random access opportunities for a random access occasions according to some embodiments of the present disclosure.
Figure 14:
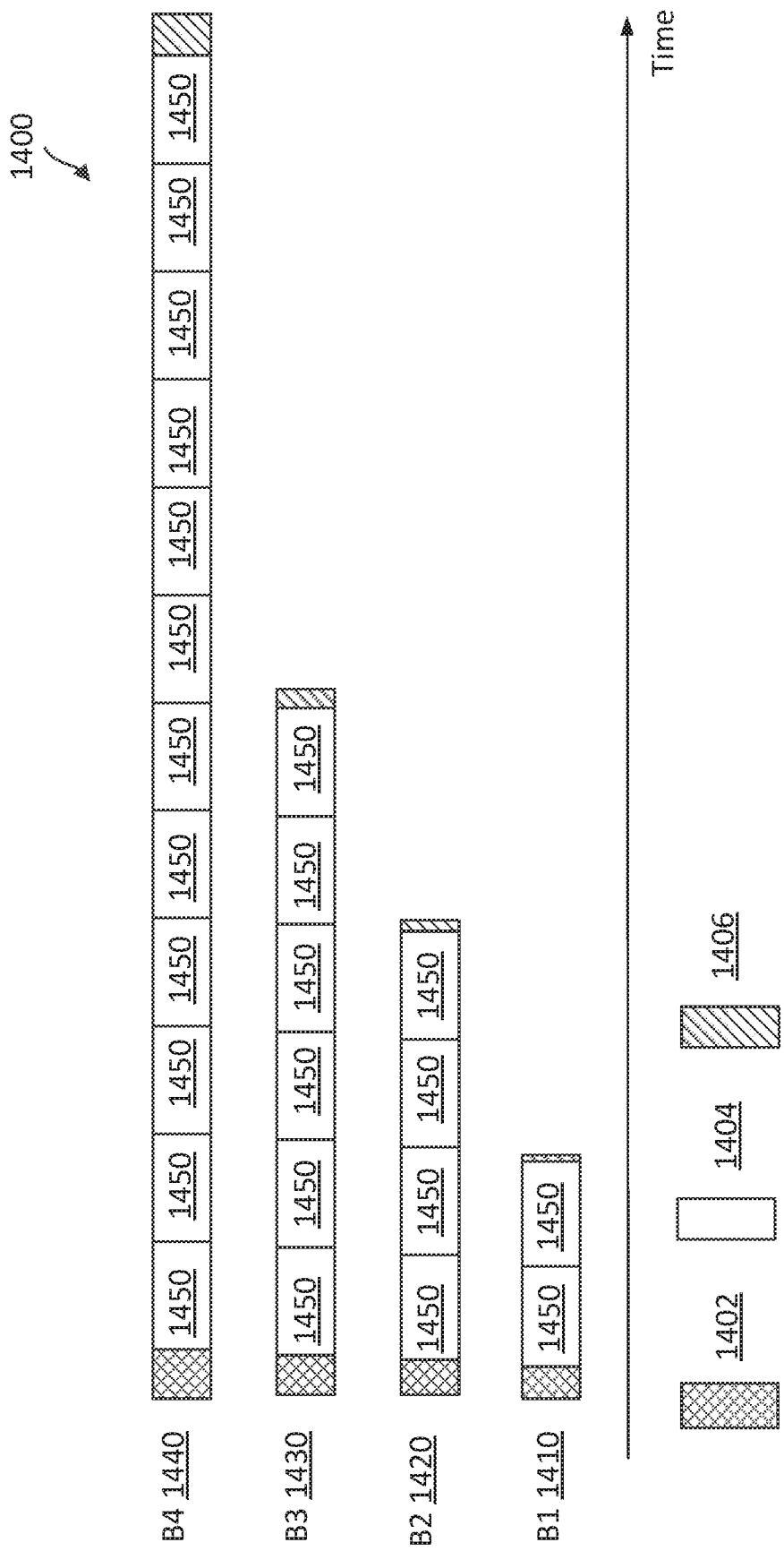
FIG. 14 illustrates a random access preamble signal configuration according to some embodiments of the present disclosure.
Figure 15:
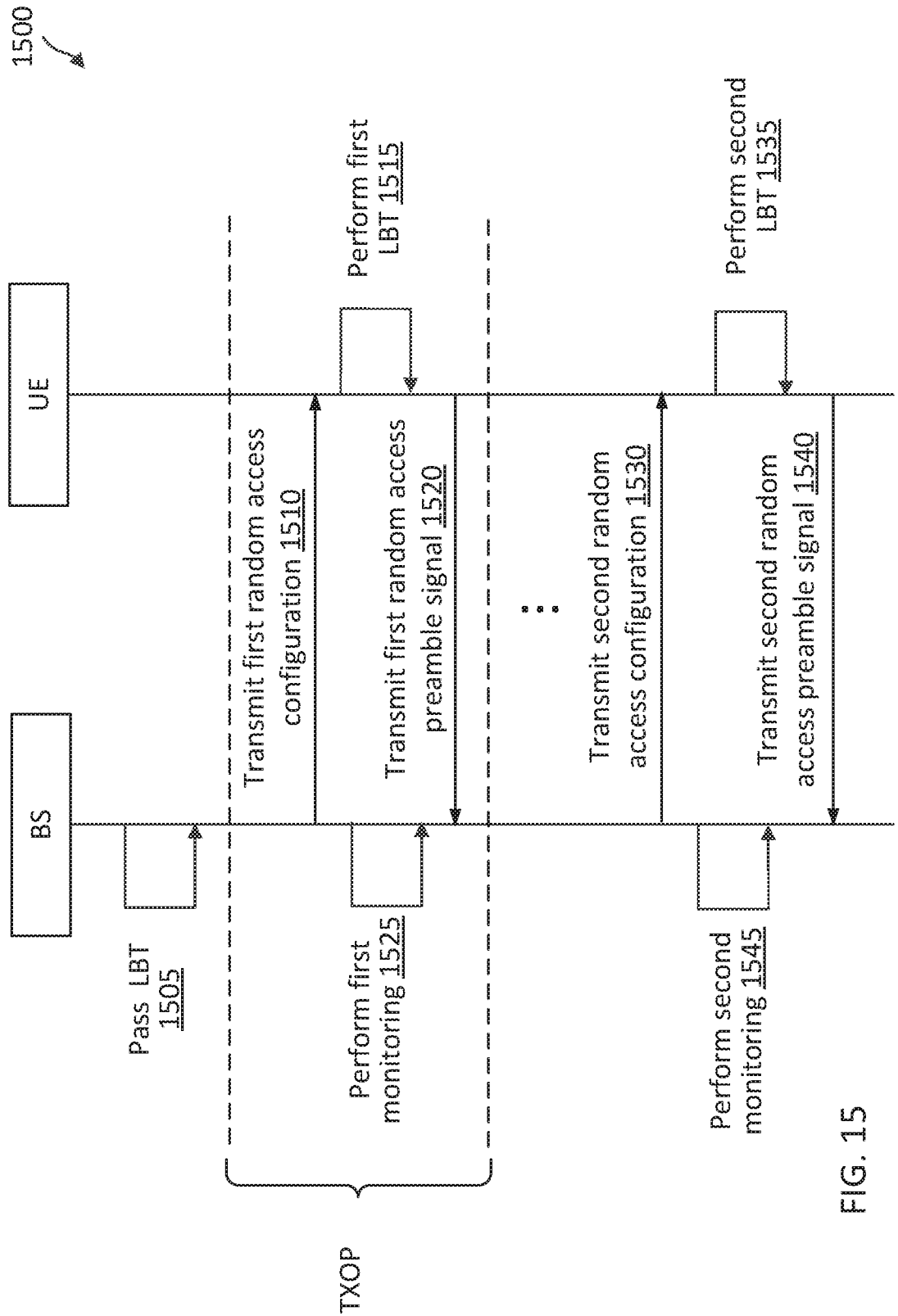
FIG. 15 is a signaling diagram illustrating a random access preamble transmission method 1500 according to some embodiments of the present disclosure.

FIGS. 13-15 illustrate various mechanisms for provisioning multiple starting positions for a random access occasion. In FIGS. 13-14, the x-axis represent time in some constant units.

FIG. 13 illustrates a random access preamble transmission scheme 1300 that provisions multiple random access opportunities for a random access occasions according to some embodiments of the present disclosure. The scheme 1300 may be employed by BSs such as the BSs 105 and 400 and UEs such as the UEs 115 and 300 in a network such as the network 100. In FIG. 13, the x-axis represents time in some constant units. In the scheme 1300, a BS may contend for a TXOP 1302 in a shared frequency band or unlicensed frequency band (e.g., the frequency channel 202). Upon gaining a TXOP 1302, the BS may configure a random access occasion 1304 within the TXOP 1302. The BS may provision for multiple random access opportunities 1306 for the random access occasion 1304 to allow a UE to start a random access preamble signal transmission at a later time (e.g., due to LBTs). For simplicity of illustration and discussion, FIG. 13 illustrates three random access opportunities 1306a, 1306b, and 1306c for the random access occasion 1304. However, the BS may configure any suitable number of random access opportunities 1306 (e.g., about 2, 4, 5, or more) for the random access occasion 1304. A UE may use a random access opportunity to transmit a random access preamble signal, for example, to initiate a network access procedure.

The random access opportunities 1306a, 1306b, and 1306c begin at different starting positions 1308a, 1308b, and 1308c, respectively, and may at least partially overlap with each other. In an example, the starting positions 1308a, 1308b, and 1308c may correspond to symbols 0, 2, and 4, respectively. The multiple starting positions 1308 or the multiple random access opportunities 1306 allow a UE to start transmitting a random access preamble signal at various time locations, for example, based on an LBT pass. For example, the UE may perform LBTs 240 according to the multiple starting positions 1308. If the UE passes an LBT 240 prior to the starting position 1308a as shown by the checked mark, the UE may transmit a random access preamble signal 1310 using the random access opportunity 1306a beginning at the position 1308a. If the UE fails an LBT 240 prior to the starting position 1308a as shown by the "X" mark, but passes the LBT 240 prior to the starting position 1308b as shown by the checked mark, the UE may transmit a random access preamble signal 1320 using the random access opportunity 1306b beginning at the position 1308b. If the UE fails LBTs 240 prior to the starting positions 1308a and 1308b as shown by the "X" marks, but passes the LBT 240 prior to the starting position 1308c as shown by the checked mark, the UE may transmit a random access preamble signal 1330 using the random access opportunity 1306c beginning at the position 1308c.

As can be observed, the random access opportunities 1306a, 1306b, and 1306c have different durations. For example, the random access preamble signal 1310 transmitted in the random access opportunity 1306a starting at the starting position 1308a may include a full long PRACH format signal, whereas the random access preamble signal 1320 transmitted in the random access opportunity 1306b starting at a later position 1308b may include a truncated version of the long PRACH format signal (e.g., the random access preamble signal 1320). A few example PRACH signal formats from NR are described herein.

FIG. 14 illustrates a random access preamble signal configuration 1400 according to some embodiments of the present disclosure. The configuration 1400 may be employed by BSs such as the BSs 105 and 400 and UEs such as the UEs 115 and 300 in a network such as the network 100. The reference signal configuration 1400 can be used in conjunction with the scheme 1300. The configuration 1400 illustrate example PRACH formats including a format B1 1410, a format B2 1420, a format B3 1430, and a format B4 1440.

In an embodiment, the format B4 1440 may include a cyclic prefix (CP) 1402, about 12 symbols 1404 (e.g., the symbols 206), and a guard time (GT) 1406. The format B3 1430 may include a CP 1402, about 6 symbols 1404, and a GT 1406. The format B2 1420 may include a CP 1402, about 4 symbols 1404, and a GT 1406. The format B1 1410 may include a CP 1402, about 2 symbols 1404, and a GT 1406. The format B4 1440 may include about 12 repeating sequences 1450 each carried in one symbol 1404. The sequence 1450 may be a predetermine sequence including a certain sequence pattern. The format B3 1430 may include about 6 repeating sequences 1450 each carried in one symbol 1404. The format B2 1420 may include about 4 repeating sequences 1450 each carried in one symbol 1404. The format B1 1410 may include about 2 repeating sequences 1450 each carried in one symbol 1404. The CP 1402 may include an end portion of a sequence 1450. The GT 1406 may include no transmission. The format B4 1440 may be referred to as a long PRACH format. The format B3 1330, the format B2 1320, and the format B1 1310 may be referred to as a short PRACH format.

In an example, the scheme 1300 configures the random access occasion 1304 with a long preamble format B4 1440. A UE passing an LBT early may transmit a random access preamble signal 1310 with the format B4 1440 using the random access opportunity 1306a. A UE passing an LBT at a later time may transmit a random access preamble signal with a shortened form of the format B4 1440 (e.g., by truncating the first few symbols of the format B4 1440) using the random access opportunity 1306b or 1306c. For example, the UE may drop the first two symbols of the format B4 1440 from the random access preamble signal transmission (e.g., random access preamble signal 1320) when using the random access opportunity 1306b based on the starting position 1308b and may drop the first three symbols of the format B4 1440 from the random access preamble signal transmission (e.g., random access preamble signal 1330) when using the random access opportunity 1306*c* based on the starting position 1308*c*.

In an embodiment, the BS may configure a random access occasion (e.g., the random access occasion 1304) with multiple random access opportunities (e.g., the random access opportunities 1306) outside of a TXOP similar to the TXOP 1302. The BS may allow for a longer a random access opportunity duration outside of a TXOP and within a TXOP. In an example, the BS may configure a long PRACH format (e.g., the format B4 1440) for a random access opportunity outside of a TXOP and a short PRACH format (e.g., the format B3 1430) for a random access opportunity within a BS's TXOP. In other words, a BS acquiring a TXOP by performing a category-4 LBT allows or grants a UE to use the acquired TXOP for random access by configuring RACH resources in athe TXOP.

In an embodiment, a UE may perform LBT of different categories based one whether a random access opportunity is within a TXOP or outside of a TXOP. For example, a UE may perform a category-2 LBT (e.g., without a random-backoff) for random access opportunities within a TXOP and may perform a category-4 LBT (e.g., including a random-backoff with a variable size contention window) for random access opportunities outside of a TXOP.

In an embodiment, when a UE transmits a random access preamble signal with a reduced duration (e.g., the duration of the random access opportunity 1306*b* or 1306*c*), the UE may increase the transmission power level to improve detectability at a BS. For example, the UE may increase the transmission power level based on a ratio between a full duration (e.g., the duration of the random access opportunity 1306*a*) and a reduced duration (e.g., the duration of the random access opportunity 1306*b* or 1306*c*).

In an embodiment, after a UE fails a random access attempt (e.g., the BS fails to detect the UE transmitted random access preamble signal), the UE may perform power control (e.g., power ramping) for a subsequent random access preamble signal transmission. The UE may adjust the transmission power further based on the duration of the subsequent random access preamble signal transmission in addition to the power ramping. For example, the UE may normalize the transmission power with the duration of the subsequent random access preamble signal transmission. To minimize interference impact on an adjacent carrier due to the increased transmission power, the BS may control the starting positions of the random access opportunities within the random access occasion. The BS may configure the UE with a random access configuration (e.g., including a random access occasion with multiple starting positions and a corresponding PRACH format) via an RRC configuration and/or C-PDCCH.

FIG. 15 is a signaling diagram illustrating a random access preamble transmission method 1500 according to some embodiments of the present disclosure. The method 1500 is implemented by a BS (e.g., the BSs 105 and 400) and a UE (e.g., the UEs 115 and 300) in a network (e.g., the network 100). The method 1500 may use similar mechanisms as in the scheme 1300 and the configuration 1400 described above with respect to FIGS. 13 and 14, respectively. Steps of the method 1500 can be executed by computing devices (e.g., a processor, processing circuit, and/or other suitable component) of the BS and the UE. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1505, the BS performs an LBT (e.g., the LBTs 240) in a channel. For example, the LBT result is a pass. Thus, the BS gains a TXOP (e.g., the TXOP 1302) in the channel.

At step 1510, the BS transmits a first random access configuration. The first random access configuration may indicate a random access occasion (e.g., the random access occasion 1304) within the TXOP. The random access occasion may include multiple random access opportunities (e.g., the random access opportunities 1306) with different starting positions (e.g., the starting positions 1308). The first random access configuration may indicate a PRACH format (e.g., the format B4 1440) and the random access opportunities.

At step 1515, the UE performs one or more first LBTs (e.g., cat-2 LBT) based on the random access opportunities indicated by the first random access configuration. For example, one of the first LBTs results in a pass.

At step 1520, the UE transmits a random access preamble signal (e.g., the random access preamble signals 1310, 1322, and 1330) using a random access opportunity corresponding to the passed LBT. The random access preamble signal may include the PRACH format for the random access occasion.

At step 1525, the BS performs first monitoring for a random access preamble signal based on the random access opportunities included in the first random access configuration.

At step 1530, the BS transmits a second random access configuration. The second random access configuration may indicate a random access occasion (e.g., the random access occasion 1304) outside of a TXOP. The random access occasion may include multiple random access opportunities (e.g., the random access opportunities 1306) with different starting positions (e.g., the starting positions 1308). The second random access configuration may indicate a PRACH format for the random access opportunities.

At step 1535, the UE performs one or more second LBTs (e.g., a cat-4 LBT) based on the second random access opportunity (e.g., the random access opportunity 1306*a*) indicated by the second random access configuration. For example, one of the second LBTs results in a pass.

At step 1540, the UE transmits a random access preamble signal (e.g., the random access preamble signals 1310, 1322, and 1330) using a random access opportunity corresponding to the passed LBT. The UE may use the configured format and truncate the first few symbols depending on the starting position and transmit the remaining part of the preamble signal.

At step 1545, the BS performs second monitoring for a random access preamble signal based on the random access opportunities included in the second random access configuration.

Figure 16:
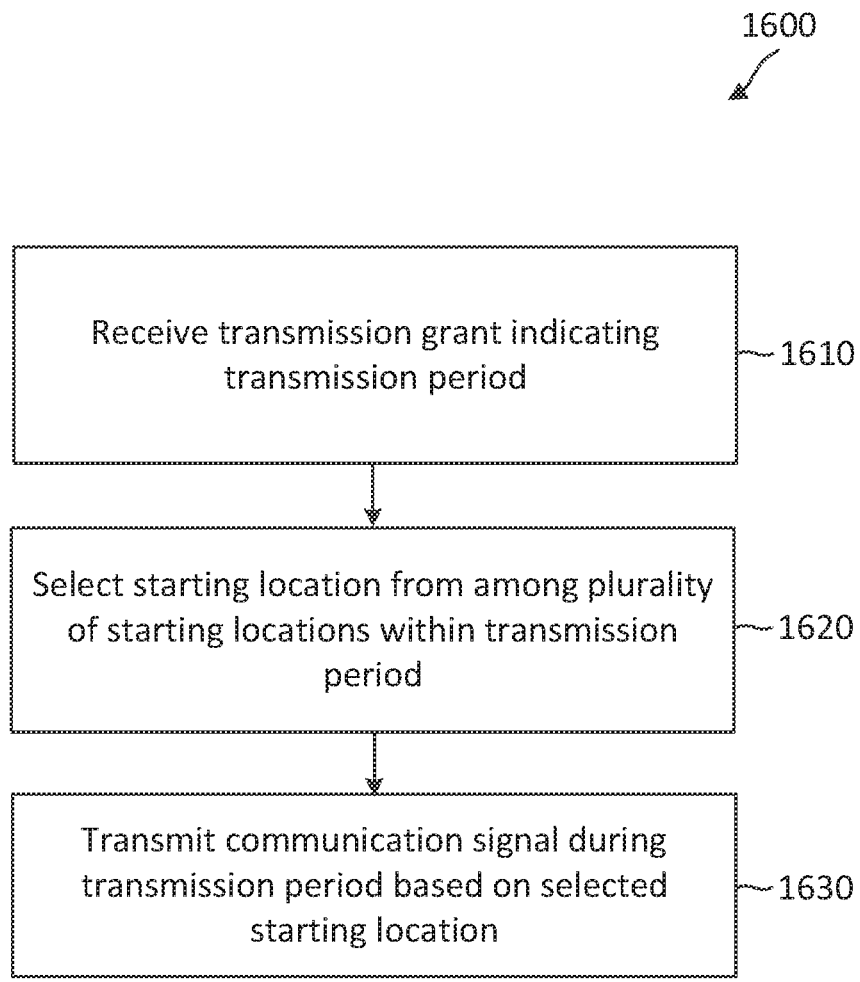
FIG. 16 is a flow diagram of a communication method according to some embodiments of the present disclosure.

FIG. 16 is a flow diagram of a communication method 1600 according to some embodiments of the present disclosure. Steps of the method 1600 can be executed by a computing device (e.g., a processor, processing circuit, and/or other suitable component) of a wireless communication device or other suitable means for performing the steps. For example, a wireless communication device, such as the UEs 115 and/or UE 300, may utilize one or more components, such as the processor 302, the memory 304, the communication module 308, the transceiver 310, and the one or more antennas 316, to execute the steps of method 1600. The method 1600 may employ similar mechanisms as in the schemes 500, 600, 800, 900, 1000, 1100, and 1200 and the configuration 700 described with respect to FIGS. 5, 6, 8, 9, 10, 11, 12, and 7, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes receiving, by a first wireless communication device from a second wireless communication device, a transmission grant indicating a transmission period (e.g., including one or more slots 204). The first wireless communication device may correspond to a UE (e.g., the UEs 115 and 300). The second wireless communication device may correspond to a BS (e.g., the BSs 105 and 400).

At step 1620, the method 1600 includes selecting, by the first wireless communication device, a starting location for transmitting a communication signal (e.g., the UL communication signals 510, 520, 530, 610, 620, 630, 810, 910, 1010, 1110, 1120, 1130, 1140, 1150, and 1160) from among a plurality of starting locations (e.g., the starting positions 512, 522, 532, 612, 633, 632, 704, 912, 1012, 1112, 1122, 1132, 1142, 1152, and 1162) within the transmission period.

At step 1630, the method 1600 includes transmitting, by the first wireless communication device to the second wireless communication device in response to the transmission grant, the communication signal during the transmission period based on the selected starting location.

In an embodiment, the first wireless communication device can further receive a configuration indicating a plurality of reference signal symbols (e.g., the reference signal symbols 206r) within the transmission period and an association between the plurality of starting locations and the plurality of reference signal symbols. In an embodiment, the association is based on locations of the plurality of reference signal symbols within the transmission period, for example, as shown in the schemes 500, 600, and 800. In an embodiment, the association is further based on a number of the plurality of reference signal symbols in the transmission period, for example, as shown in the scheme 1100.

In an embodiment, the configuration indicates a first reference signal symbol time density in a first portion (e.g., the slots $204_{(1)}$ and $204_{(2)}$ of the UL burst 702) of the transmission period and a second reference signal symbol time density in a second portion (e.g., the slots $204_{(3)}$ and $204_{(4)}$ of the UL burst 702) of the transmission period, as shown in the configuration 700. For example, a first subset of the plurality of reference signal symbols in a portion of the transmission period are spaced apart from each other by a first offset and a second subset of the plurality of reference signal symbols in another portion of the transmission period are spaced apart from each other by a second offset different from the first offset.

In an embodiment, the communication signal can include information (e.g., the UCI 914) associated with the selected starting location. In an embodiment, the communication signal can include a preamble signal (e.g., the preamble signal 1014) beginning at the selected starting location. In an embodiment, the preamble signal can include a sequence pattern (e.g., a scrambling sequence) that is associated with the selected starting location.

Figure 17:
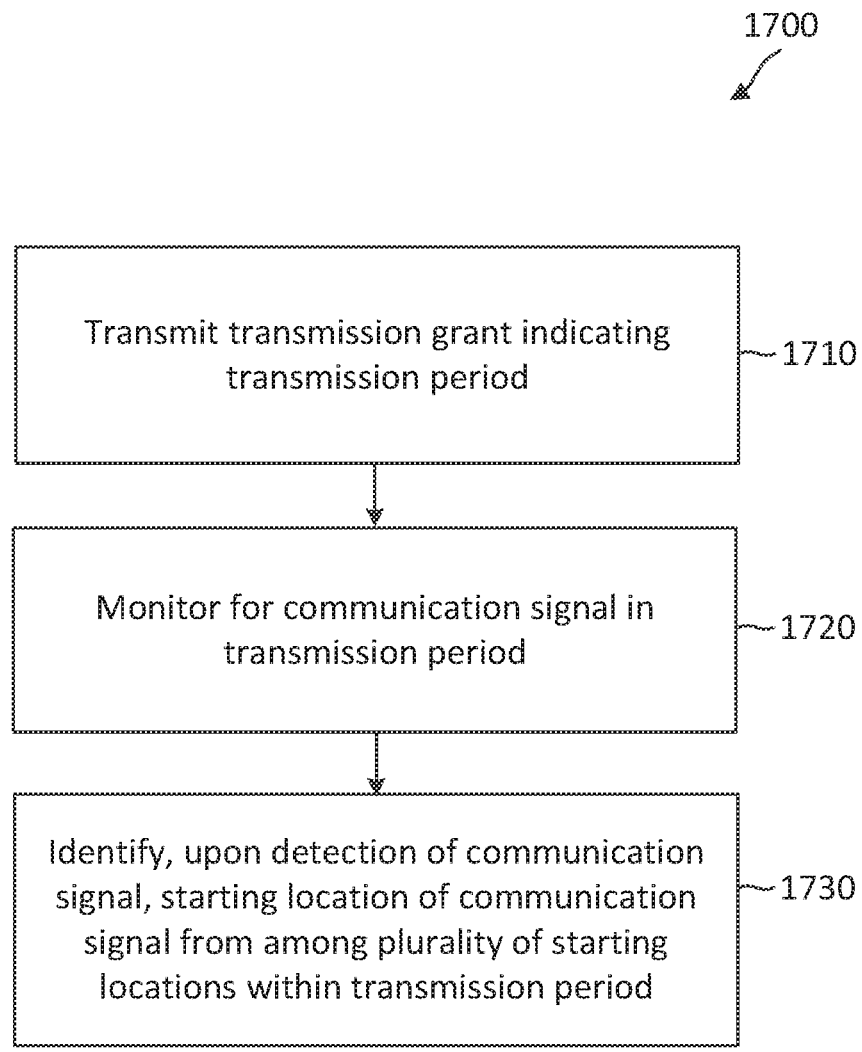
FIG. 17 is a flow diagram of a communication method according to some embodiments of the present disclosure.

FIG. 17 is a flow diagram of a communication method 1700 according to some embodiments of the present disclosure. Steps of the method 1700 can be executed by a computing device (e.g., a processor, processing circuit, and/or other suitable component) of a wireless communication device or other suitable means for performing the steps. For example, a wireless communication device, such as the BSs 105 and/or BS 400, may utilize one or more components, such as the processor 402, the memory 404, the communication module 408, the transceiver 410, and the one or more antennas 416, to execute the steps of method 1700. The method 1700 may employ similar mechanisms as in the schemes 500, 600, 800, 900, 1000, 1100, and 1200 and the configuration 700 described with respect to FIGS. 5, 6, 8, 9, 10, 11, 12, and 7, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes transmitting, by a first wireless communication device to a second wireless communication device, a transmission grant indicating a transmission period (e.g., including one or more slots 204). The first wireless communication device may correspond to a BS (e.g., the BSs 105 and 400). The second wireless communication device may correspond to a UE (e.g., the UEs 115 and 300).

At step 1720, the method 1700 includes monitoring, by the first wireless communication device in response to the transmission grant, for a communication signal (e.g., the UL communication signals 510, 520, 530, 610, 620, 630, 810, 910, 1010, 1110, 1120, 1130, 1140, 1150, and 1160) from the second wireless communication device in the transmission period.

At step 1730, the method 1700 includes identifying, by the first wireless communication device upon detection of the communication signal, a starting location of the communication signal from among a plurality of starting locations (e.g., the starting positions 512, 522, 532, 612, 633, 632, 704, 912, 1012, 1112, 1122, 1132, 1142, 1152, and 1162) within the transmission period.

In an embodiment, the first wireless communication device transmits a configuration indicating a plurality of reference signal symbols (e.g., the reference signal symbols 206r) within the transmission period and an association between the plurality of starting locations and the plurality of reference signal symbols. In an embodiment, the association is based on locations of the plurality of reference signal symbols within the transmission period, for example, as shown in the schemes 500, 600, and 800. In an embodiment, the association is further based on a number of the plurality of reference signal symbols in the transmission period, for example, as shown in the scheme 1100.

In an embodiment, the first wireless communication device performs the monitoring by monitoring for a reference signal (e.g., the reference signal 210) associated with the communication signal from the second wireless communication device at one or more of the plurality of reference signal symbols. The first wireless communication device identifies the starting location based on a detection of the reference signal and the association between the plurality of starting locations and the plurality of reference signal symbols.

In an embodiment, the configuration indicates a first reference signal symbol time density in a first portion (e.g., the slots $204_{(1)}$ and $204_{(2)}$ of the UL burst 702) of the transmission period and a second reference signal symbol time density in a second portion (e.g., the slots $204_{(3)}$ and $204_{(4)}$ of the UL burst 702) of the transmission period, as shown in the configuration 700. For example, a first subset of the plurality of reference signal symbols in a portion of the transmission period are spaced apart from each other by a first offset, and wherein a second subset of the plurality of reference signal symbols in another portion of the transmission period are spaced apart from each other by a second offset different from the first offset.

In an embodiment, the first wireless communication device performs the monitoring by monitoring for at least one of control information (e.g., the UCI 914) or a preamble signal (e.g., the preamble signal 1014) associated with the communication signal from the second wireless communication device during the transmission period, where the identifying is based on a detection of the at least one of the control information or the preamble signal.

In an embodiment, the first wireless communication device further receives, from the second wireless communication device, the communication signal during a first transmission slot and a second transmission slot within the transmission period, where the communication signal begins at the identified starting location within the first transmission slot. The first wireless communication device recovers data (e.g., the UL data 222) from a portion of the communication signal received during the first transmission slot based on channel information determined from a reference signal associated with the communication signal received during the second transmission slot.

In an embodiment, the first wireless communication device performs the monitoring by monitoring for the preamble signal. The first wireless communication device further receives, from the second wireless communication device, the communication signal based on a detection of the preamble signal. The first wireless communication device further receives data from the communication signal based on channel information determined from the preamble signal.

Figure 18:
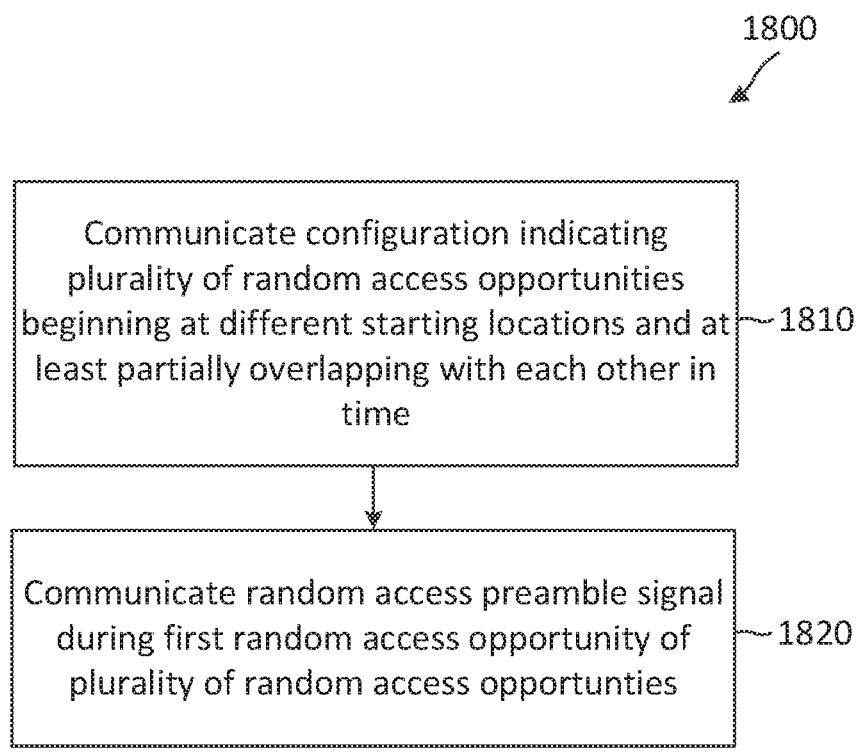
FIG. 18 is a flow diagram of a random access method according to some embodiments of the present disclosure.

FIG. 18 is a flow diagram of a communication method 1800 according to some embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the UEs 115 and/or 300, may utilize one or more components, such as the processor 302, the memory 304, the communication module 308, the transceiver 310, and the one or more antennas 316, to execute the steps of method 1800. In another example, a wireless communication device, such as the BSs 105 and/or 400, may utilize one or more components, such as the processor 402, the memory 404, the communication module 408, the transceiver 410, and the one or more antennas 416, to execute the steps of method 1800. The method 1800 may employ similar mechanisms as in the schemes 1300, the configuration 1400, and the method 1500 described with respect to FIGS. 13. 14, and 15, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating, by a first wireless communication device with a second wireless communication device, a configuration indicating a plurality of random access opportunities (e.g., the random access opportunities 1306) within a transmission period (e.g., a random access occasion 1304), the plurality of random access opportunities beginning at different starting time locations (e.g., the starting positions 1308) and at least partially overlapping with each other in time.

In an embodiment, the first wireless communication device may correspond to a BS (e.g., the BSs 105 and 400) and the second wireless communication device may correspond to a UE (e.g., the UEs 115 and 300). In another embodiment, the first wireless communication device may correspond to a UE (e.g., the UEs 115 and 300) and the second wireless communication device may correspond to a BS (e.g., the BSs 105 and 400).

At step 1820, the method 1800 includes communicating, by the first wireless communication device with the second wireless communication device, a random access preamble signal (e.g., the random access preamble signals 1310, 1320, 1330) during a first random access opportunity of the plurality of random access opportunities.

In an embodiment, the random access preamble signal includes a format (e.g., the format B4 1440) that is based on at least one of a starting location of the first random access opportunity. The format includes at least a random access preamble signal duration.

In an embodiment, the first wireless communication device corresponds to a BS and the second wireless communication device corresponds to a UE. In such an embodiment, the first wireless communication device communicates the random by receiving the random access preamble signal from the second wireless communication device. The random access preamble signal includes a format that is based on whether the transmission period is within a TXOP (e.g., the TXOP 1302) of the first wireless communication device. The format includes at least a random access preamble signal duration. In an embodiment, the format includes a first random access preamble signal duration when the transmission period is within the TXOP, wherein the format includes a second random access preamble signal duration when the transmission period is outside of the TXOP, and wherein the first random access preamble signal duration is shorter than the second random access preamble signal duration.

In an embodiment, the first wireless communication device corresponds to a UE and the second wireless communication device corresponds to a BS. In such an embodiment, the first wireless communication device communicates the random access preamble signal by transmitting, to the second wireless communication device, the random access preamble signal at a transmit power level determined at least in part based on a duration of the random access preamble signal.

In an embodiment, the first wireless communication device further determine at least one of a number of the plurality of random access opportunities or durations of the plurality of random access opportunities based on whether the transmission period is within a TXOP of the first wireless communication device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including receiving, by a first wireless communication device from a second wireless communication device, a transmission grant indicating a transmission period; selecting, by the first wireless communication device, a starting location for transmitting a communication signal from among a plurality of starting locations within the transmission period; and transmitting, by the first wireless communication device to the second wireless communication device in response to the transmission grant, the communication signal during the transmission period based on the selected starting location.

In some aspects, the method may also include receiving, by the first wireless communication device, a configuration indicating a plurality of reference signal symbols within the transmission period and an association between the plurality of starting locations and the plurality of reference signal symbols. The method may also include where the association is based on locations of the plurality of reference signal symbols within the transmission period. The method may also include where the association is based on a number of the plurality of reference signal symbols in the transmission period. The method may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The method may also include where the transmitting includes transmitting, by the first wireless communication device to the second wireless communication device, the communication signal including information associated with the selected starting location. The method may also include where the transmitting includes transmitting, by the first wireless communication device to the second wireless communication device, the communication signal including a preamble signal beginning at the selected starting location. The method may also include where the preamble signal includes a sequence pattern that is associated with the selected starting location. The method may also include where the selecting is based on a listen-before-talk (LBT) procedure.

Further embodiments of the present disclosure include a method of wireless communication, including transmitting, by a first wireless communication device to a second wireless communication device, a transmission grant indicating a transmission period; monitoring, by the first wireless communication device in response to the transmission grant, for a communication signal from the second wireless communication device in the transmission period; and identifying, by the first wireless communication device upon detection of the communication signal, a starting location of the communication signal from among a plurality of starting locations within the transmission period.

In some aspects, the method may also include transmitting, by the first wireless communication device, a configuration indicating a plurality of reference signal symbols within the transmission period and an association between the plurality of starting locations and the plurality of reference signal symbols. The method may also include where the association is based on at least one of locations of the plurality of reference signal symbols within the transmission period. The method may also include where the association is based on a number of the plurality of reference signal symbols in the transmission period. The method may also include where the monitoring includes monitoring, by the first wireless communication device, for a reference signal associated with the communication signal from the second wireless communication device at one or more of the plurality of reference signal symbols. The method may also include where the identifying is based on a detection of the reference signal and the association between the plurality of starting locations and the plurality of reference signal symbols. The method may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The method may also include determining, by the first wireless communication device, the first reference signal symbol time density in the first portion of the transmission period and the second reference signal symbol time density in the second portion of the transmission period. The method may also include where the monitoring includes monitoring, by the first wireless communication device, for at least one of control information or a preamble signal associated with the communication signal from the second wireless communication device during the transmission period, and where the identifying is based on a detection of the at least one of the control information or the preamble signal. The method may also include receiving, by the first wireless communication device from the second wireless communication device, the communication signal during a first transmission slot and a second transmission slot within the transmission period, the communication signal beginning at the identified starting location within the first transmission slot; and recovering, by the first wireless communication device, data from a portion of the communication signal received during the first transmission slot based on channel information determined from a reference signal associated with the communication signal received during the second transmission slot. The method may also include where the monitoring includes monitoring for the preamble signal, and where the method further includes receiving, by the first wireless communication device from the second wireless communication device, the communication signal based on a detection of the preamble signal; and recovering, by the first wireless communication device, data from the communication signal based on channel information determined from the preamble signal.

Further embodiments of the present disclosure include a method of wireless communication device, including communicating, by a first wireless communication device with a second wireless communication device, a configuration indicating a plurality of random access opportunities within a transmission period, the plurality of random access opportunities beginning at different starting time locations and at least partially overlapping with each other in time; and communicating, by the first wireless communication device with the second wireless communication device, a random access preamble signal during a first random access opportunity of the plurality of random access opportunities.

The method may also include where the random access preamble signal includes a format that is based on at least one of a starting location of the first random access opportunity, the format including at least a random access preamble signal duration. The method may also include where the communicating the random access preamble signal includes receiving, by the first wireless communication device from the second wireless communication device, the random access preamble signal. The method may also include where the random access preamble signal includes a format that is based on whether the transmission period is within a transmission opportunity (TXOP) of the first wireless communication device, the format including at least a random access preamble signal duration. The method may also include where the format includes a first random access preamble signal duration when the transmission period is within the TXOP, where the format includes a second random access preamble signal duration when the transmission period is outside of the TXOP, and where the first random access preamble signal duration is shorter than the second random access preamble signal duration. The method may also include where the communicating the random access preamble signal includes transmitting, by the first wireless communication device to the second wireless communication device, the random access preamble signal at a transmit power level determined at least in part based on a duration of the random access preamble signal.

Further embodiments of the present disclosure include an apparatus including a processor configured to select a starting location for transmitting a communication signal from among a plurality of starting locations within a transmission period; and a transceiver configured to receive, from a wireless communication device, a transmission grant indicating the transmission period; and transmit, to the wireless communication device in response to the transmission grant, the communication signal during the transmission period based on the selected starting location.

The apparatus may also include where the transceiver is further configured to receive a configuration indicating a plurality of reference signal symbols within the transmission period and an association between the plurality of starting locations and the plurality of reference signal symbols. The apparatus may also include where the association is based on locations of the plurality of reference signal symbols within the transmission period. The apparatus may also include where the association is based on a number of the plurality of reference signal symbols in the transmission period. The apparatus may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The apparatus may also include where the communication signal includes information associated with the selected starting location. The apparatus may also include where the communication signal includes a preamble signal beginning at the selected starting location. The apparatus may also include where the preamble signal includes a sequence pattern that is associated with the selected starting location. The apparatus may also include where the processor is further configured to select the starting location based on a listen-before-talk (LBT) procedure.

Further embodiments of the present disclosure include an apparatus including a transceiver configured to transmit, to a wireless communication device, a transmission grant indicating a transmission period; and a processor configured to monitor, in response to the transmission grant, for a communication signal from the wireless communication device in the transmission period; and identify, upon detection of the communication signal, a starting location of the communication signal from among a plurality of starting locations within the transmission period.

The apparatus may also include where the transceiver is further configured to transmit a configuration indicating a plurality of reference signal symbols within the transmission period and an association between the plurality of starting locations and the plurality of reference signal symbols. The apparatus may also include where the association is based on at least one of locations of the plurality of reference signal symbols within the transmission period. The apparatus may also include where the association is based on a number of the plurality of reference signal symbols in the transmission period. The apparatus may also include where the processor is further configured to monitor for the communication signal by monitoring for a reference signal from the wireless communication device at one or more of the plurality of reference signal symbols. The apparatus may also include where the processor is further configured to identify the starting location based on a detection of the reference signal and the association between the plurality of starting locations and the plurality of reference signal symbols. The apparatus may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The apparatus may also include where the processor is further configured to determine the first reference signal symbol time density in the first portion of the transmission period and the second reference signal symbol time density in the second portion of the transmission period. The apparatus may also include where the processor is further configured to monitor for the communication signal by monitoring for at least one of control information or a preamble signal associated with the communication signal from the wireless communication device during the transmission period; and identify the starting location based on a detection of the at least one of the control information or the preamble signal. The apparatus may also include where the transceiver is further configured to receive, from the wireless communication device, the communication signal during a first transmission slot and a second transmission slot within the transmission period, the communication signal beginning at the identified starting location within the first transmission slot, and where the processor is further configured to recover data from a portion of the communication signal received during the first transmission slot based on channel information determined from a reference signal associated with the communication signal received during the second transmission slot. The apparatus may also include where the processor is further configured to monitor for the communication signal by monitoring for the preamble signal; and recover data from the communication signal based on a detection of the communication signal and channel information determined from the preamble signal.

Further embodiments of the present disclosure include an apparatus including a transceiver configured to communicate, with a wireless communication device, a configuration indicating a plurality of random access opportunities within a transmission period, the plurality of random access opportunities beginning at different starting time locations and at least partially overlapping with each other in time; and communicate, with the wireless communication device, a random access preamble signal during a first random access opportunity of the plurality of random access opportunities.

The apparatus may also include where the random access preamble signal includes a format that is based on at least one of a starting location of the first random access opportunity, the format including at least a random access preamble signal duration. The apparatus may also include where the transceiver is further configured to communicate the random access preamble signal by receiving, from the wireless communication device, the random access preamble signal. The apparatus may also include where the random access preamble signal includes a format that is based on whether the transmission period is within a transmission opportunity (TXOP) of the wireless communication device, the format including at least a random access preamble signal duration. The apparatus may also include where the format includes a first random access preamble signal duration when the transmission period is within the TXOP, where the format includes a second random access preamble signal duration when the transmission period is outside of the TXOP, and where the first random access preamble signal duration is shorter than the second random access preamble signal duration. The apparatus may also include where the transceiver is further configured to communicate the random access preamble signal by transmitting, to the wireless communication device, the random access preamble signal at a transmit power level determined at least in part based on a duration of the random access preamble signal.

Further embodiments of the present disclosure include a non-transitory computer-readable medium having program code recorded thereon, the program code including code for causing a first wireless communication device to receive, from a second wireless communication device, a transmission grant indicating a transmission period; code for causing the first wireless communication device to select a starting location for transmitting a communication signal from among a plurality of starting locations within the transmission period; and code for causing the first wireless communication device to transmit, to the second wireless communication device in response to the transmission grant, the communication signal during the transmission period based on the selected starting location.

The non-transitory computer-readable medium may also include code for causing the first wireless communication device to receive a configuration indicating a plurality of reference signal symbols within the transmission period and an association between the plurality of starting locations and the plurality of reference signal symbols. The non-transitory computer-readable medium may also include where the association is based on locations of the plurality of reference signal symbols within the transmission period. The non-transitory computer-readable medium may also include where the association is based on a number of the plurality of reference signal symbols in the transmission period. The non-transitory computer-readable medium may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The non-transitory computer-readable medium may also include where the code for causing the first wireless communication device to transmit the communication signal is further configured to transmitting, to the second wireless communication device, the communication signal including information associated with the selected starting location. The non-transitory computer-readable medium may also include where the code for causing the first wireless communication device to transmit the communication signal is further configured to transmitting, to the second wireless communication device, the communication signal including a preamble signal beginning at the selected starting location. The non-transitory computer-readable medium may also include where the preamble signal includes a sequence pattern that is associated with the selected starting location. The non-transitory computer-readable medium may also include where the code for causing the first wireless communication device to select the starting location is further configured to select the starting location based on a listen-before-talk (LBT) procedure.

Further embodiments of the present disclosure include a non-transitory computer-readable medium having program code recorded thereon, the program code including code for causing a first wireless communication device to transmit, to a second wireless communication device, a transmission grant indicating a transmission period; code for causing the first wireless communication device to monitor, in response to the transmission grant, for a communication signal from the second wireless communication device in the transmission period; and code for causing the first wireless communication device to identify, upon detection of the communication signal, a starting location of the communication signal from among a plurality of starting locations within the transmission period.

The non-transitory computer-readable medium may also include code for causing the first wireless communication device to transmit a configuration indicating a plurality of reference signal symbols within the transmission period and an association between the plurality of starting locations and the plurality of reference signal symbols. The non-transitory computer-readable medium may also include where the association is based on at least one of locations of the plurality of reference signal symbols within the transmission period. The non-transitory computer-readable medium may also include where the association is based on a number of the plurality of reference signal symbols in the transmission period. The non-transitory computer-readable medium may also include where the code for causing the first wireless communication device to monitor for the communication signal is further configured to monitor for a reference signal associated with the communication signal from the second wireless communication device at one or more of the plurality of reference signal symbols. The non-transitory computer-readable medium may also include where the code for causing the first wireless communication device to identify the starting location is further configured to identify the starting location based on a detection of the reference signal and the association between the plurality of starting locations and the plurality of reference signal symbols. The non-transitory computer-readable medium may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The non-transitory computer-readable medium may also include code for causing the first wireless communication device to determine the first reference signal symbol time density in the first portion of the transmission period and the second reference signal symbol time density in the second portion of the transmission period. The non-transitory computer-readable medium may also include where the code for causing the first wireless communication device to monitor for the communication signal is further configured to monitor for at least one of control information or a preamble signal associated with the communication signal from the second wireless communication device during the transmission period, and where the code for causing the first wireless communication device to identify the starting location is further configured to identify the starting location based on a detection of the at least one of the control information or the preamble signal. The non-transitory computer-readable medium may also include code for causing the first wireless communication device to receive, from the second wireless communication device, the communication signal during a first transmission slot and a second transmission slot within the transmission period, the communication signal beginning at the identified starting location within the first transmission slot; and code for causing the first wireless communication device to recover data from a portion of the communication signal received during the first transmission slot based on channel information determined from a reference signal associated with the communication signal received during the second transmission slot. The non-transitory computer-readable medium may also include where the code for causing the first wireless communication device to monitor for the communication signal is further configured to monitor for the preamble signal, and where the non-transitory computer-readable medium further includes code for causing the first wireless communication device to receive, from the second wireless communication device, the communication signal based on a detection of the preamble signal; and code for causing the first wireless communication device to recover data from the communication signal based on channel information determined from the preamble signal.

Further embodiments of the present disclosure include an apparatus including means for receiving, from a wireless communication device, a transmission grant indicating a transmission period; means for selecting a starting location for transmitting a communication signal from among a plurality of starting locations within the transmission period; and means for transmitting, to the wireless communication device in response to the transmission grant, the communication signal during the transmission period based on the selected starting location.

The apparatus may also include means for receiving a configuration indicating a plurality of reference signal symbols within the transmission period and an association between the plurality of starting locations and the plurality of reference signal symbols. The apparatus may also include where the association is based on locations of the plurality of reference signal symbols within the transmission period. The apparatus may also include where the association is based on a number of the plurality of reference signal symbols in the transmission period. The apparatus may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The apparatus may also include where the means for transmitting the communication signal is further configured to transmitting, to the wireless communication device, the communication signal including information associated with the selected starting location. The apparatus may also include where the means for transmitting the communication signal is further configured to transmitting, to the wireless communication device, the communication signal including a preamble signal beginning at the selected starting location. The apparatus may also include where the preamble signal includes a sequence pattern that is associated with the selected starting location. The apparatus may also include where the means for selecting the starting location is further configured to select the starting location based on a listen-before-talk (LBT) procedure.

Further embodiments of the present disclosure include an apparatus including means for transmitting, to a wireless communication device, a transmission grant indicating a transmission period; means for monitoring, in response to the transmission grant, for a communication signal from the wireless communication device in the transmission period; and means for identifying, upon detection of the communication signal, a starting location of the communication signal from among a plurality of starting locations within the transmission period.

The apparatus may also include means for transmitting a configuration indicating a plurality of reference signal symbols within the transmission period and an association between the plurality of starting locations and the plurality of reference signal symbols. The apparatus may also include where the association is based on at least one of locations of the plurality of reference signal symbols within the transmission period. The apparatus may also include where the association is based on a number of the plurality of reference signal symbols in the transmission period. The apparatus may also include where the means for monitoring fort the communication signal is further configured to monitor for a reference signal associated with the communication signal from the wireless communication device at one or more of the plurality of reference signal symbols. The apparatus may also include where the means for identifying the starting location is further configured to identify the starting location based on a detection of the reference signal and the association between the plurality of starting locations and the plurality of reference signal symbols. The apparatus may also include where the configuration indicates a first reference signal symbol time density in a first portion of the transmission period and a second reference signal symbol time density in a second portion of the transmission period, where a first subset of the plurality of reference signal symbols in the first portion are spaced apart from each other by a first offset, and where a second subset of the plurality of reference signal symbols in the second portion are spaced apart from each other by a second offset different from the first offset. The apparatus may also include means for determining the first reference signal symbol time density in the first portion of the transmission period and the second reference signal symbol time density in the second portion of the transmission period. The apparatus may also include where the means for monitoring for the communication signal is further configured to monitor for at least one of control information or a preamble signal associated with the communication signal from the wireless communication device during the transmission period, and where the means for identifying the starting location is further configured to identify the starting location based on a detection of the at least one of the control information or the preamble signal. The apparatus may also include means for receiving, from the wireless communication device, the communication signal during a first transmission slot and a second transmission slot within the transmission period, the communication signal beginning at the identified starting location within the first transmission slot; and means for recovering data from a portion of the communication signal received during the first transmission slot based on channel information determined from a reference signal associated with the communication signal received during the second transmission slot. The apparatus may also include where the means for monitoring for the communication signal is further configured to monitor for the preamble signal, and where the apparatus further includes means for receiving, from the wireless communication device, the communication signal based on a detection of the preamble signal; and recover data from the communication signal based on channel information determined from the preamble signal.

Further embodiments of the present disclosure include an apparatus including means for communicating, with a wireless communication device, a configuration indicating a plurality of random access opportunities within a transmission period, the plurality of random access opportunities beginning at different starting time locations and at least partially overlapping with each other in time; and means for communicating, with the wireless communication device, a random access preamble signal during a first random access opportunity of the plurality of random access opportunities. The apparatus may also include where the random access preamble signal includes a format that is based on at least one of a starting location of the first random access opportunity, the format including at least a random access preamble signal duration. The apparatus may also include where the means for communicating the random access preamble signal is further configured to receive, from the wireless communication device, the random access preamble signal. The apparatus may also include where the random access preamble signal includes a format that is based on whether the transmission period is within a transmission opportunity (TXOP) of the apparatus, the format including at least a random access preamble signal duration. The apparatus may also include where the format includes a first random access preamble signal duration when the transmission period is within the TXOP, where the format includes a second random access preamble signal duration when the transmission period is outside of the TXOP, and where the first random access preamble signal duration is shorter than the second random access preamble signal duration. The apparatus may also include where the means for communicating the random access preamble signal is further configured to transmit, to the wireless communication device, the random access preamble signal at a transmit power level determined at least in part based on a duration of the random access preamble signal.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device from a second wireless communication device, a transmission grant indicating a transmission period;
receiving, by the first wireless communication device, a configuration indicating a plurality of reference signal symbols within the transmission period and an association between a plurality of starting locations and the plurality of reference signal symbols, wherein the configuration indicates a first reference signal symbol time density in a first portion of the transmission period and a second reference signal symbol time density in a second portion of the transmission period, wherein a first subset of the plurality of reference signal symbols in the first portion are spaced apart from each other by a first offset, and wherein a second subset of the plurality of reference signal symbols in the second portion are spaced apart from each other by a second offset different from the first offset;
selecting, by the first wireless communication device, a starting location for transmitting a communication signal from among the plurality of starting locations within the transmission period; and
transmitting, by the first wireless communication device to the second wireless communication device in response to the transmission grant, the communication signal during the transmission period based on the selected starting location.

2. The method of claim 1, wherein the association is based on locations of the plurality of reference signal symbols within the transmission period.

3. The method of claim 2, wherein the association is based on a number of the plurality of reference signal symbols in the transmission period.

4. The method of claim 1, wherein the transmitting includes:
   transmitting, by the first wireless communication device to the second wireless communication device, the communication signal including information associated with the selected starting location.

5. The method of claim 1, wherein the transmitting includes:
   transmitting, by the first wireless communication device to the second wireless communication device, the communication signal including a preamble signal beginning at the selected starting location.

6. The method of claim 5, wherein the preamble signal includes a sequence pattern that is associated with the selected starting location.

7. The method of claim 1, wherein the selecting is based on a listen-before-talk (LBT) procedure.

8. A method of wireless communication, comprising:
   transmitting, by a first wireless communication device to a second wireless communication device, a transmission grant indicating a transmission period;
   transmitting, by the first wireless communication device, a configuration indicating a plurality of reference signal symbols within the transmission period and an association between a plurality of starting locations and the plurality of reference signal symbols, wherein the configuration indicates a first reference signal symbol time density in a first portion of the transmission period and a second reference signal symbol time density in a second portion of the transmission period, wherein a first subset of the plurality of reference signal symbols in the first portion are spaced apart from each other by a first offset, and wherein a second subset of the plurality of reference signal symbols in the second portion are spaced apart from each other by a second offset different from the first offset;
   monitoring, by the first wireless communication device in response to the transmission grant, for a communication signal from the second wireless communication device in the transmission period; and
   identifying, by the first wireless communication device upon detection of the communication signal, a starting location of the communication signal from among the plurality of starting locations within the transmission period.

9. The method of claim 8, wherein the association is based on at least one of locations of the plurality of reference signal symbols within the transmission period.

10. The method of claim 9, wherein the association is based on a number of the plurality of reference signal symbols in the transmission period.

11. The method of claim 8, wherein the monitoring includes:
    monitoring, by the first wireless communication device, for a reference signal associated with the communication signal from the second wireless communication device at one or more of the plurality of reference signal symbols.

12. The method of claim 11, wherein the identifying is based on a detection of the reference signal and the association between the plurality of starting locations and the plurality of reference signal symbols.

13. The method of claim 8, further comprising:
    determining, by the first wireless communication device, the first reference signal symbol time density in the first portion of the transmission period and the second reference signal symbol time density in the second portion of the transmission period.

14. The method of claim 8, wherein the monitoring includes:
    monitoring, by the first wireless communication device, for at least one of control information or a preamble signal associated with the communication signal from the second wireless communication device during the transmission period, and
    wherein the identifying is based on a detection of the at least one of the control information or the preamble signal.

15. The method of claim 14, further comprising:
    receiving, by the first wireless communication device from the second wireless communication device, the communication signal during a first transmission slot and a second transmission slot within the transmission period, the communication signal beginning at the identified starting location within the first transmission slot; and
    recovering, by the first wireless communication device, data from a portion of the communication signal received during the first transmission slot based on channel information determined from a reference signal associated with the communication signal received during the second transmission slot.

16. The method of claim 14, wherein the monitoring includes monitoring for the preamble signal, and wherein the method further comprises:
    receiving, by the first wireless communication device from the second wireless communication device, the communication signal based on a detection of the preamble signal; and
    recovering, by the first wireless communication device, data from the communication signal based on channel information determined from the preamble signal.

17. A method of wireless communication device, comprising:
    communicating, by a first wireless communication device with a second wireless communication device, a configuration indicating a plurality of random access opportunities within a transmission period, the plurality of random access opportunities beginning at different starting time locations and at least partially overlapping with each other in time; and
    communicating, by the first wireless communication device with the second wireless communication device, a random access preamble signal during a first random access opportunity of the plurality of random access opportunities.

18. The method of claim 17, wherein the random access preamble signal includes a format that is based on at least one of a starting location of the first random access opportunity, the format including at least a random access preamble signal duration.

19. The method of claim 17, wherein the communicating the random access preamble signal includes:
    receiving, by the first wireless communication device from the second wireless communication device, the random access preamble signal.

20. The method of claim 19, wherein the random access preamble signal includes a format that is based on whether the transmission period is within a transmission opportunity (TXOP) of the first wireless communication device, the format including at least a random access preamble signal duration.

21. The method of claim 20, wherein the format includes a first random access preamble signal duration when the transmission period is within the TXOP, wherein the format includes a second random access preamble signal duration when the transmission period is outside of the TXOP, and wherein the first random access preamble signal duration is shorter than the second random access preamble signal duration.

22. The method of claim 17, wherein the communicating the random access preamble signal includes:
   transmitting, by the first wireless communication device to the second wireless communication device, the random access preamble signal at a transmit power level determined at least in part based on a duration of the random access preamble signal.

23. An apparatus comprising:
   a processor configured to select a starting location for transmitting a communication signal from among a plurality of starting locations within a transmission period; and
   a transceiver configured to:
      receive, from a wireless communication device, a transmission grant indicating the transmission period;
      receive a configuration indicating a plurality of reference signal symbols within the transmission period and an association between the plurality of starting locations and the plurality of reference signal symbols, wherein the configuration indicates a first reference signal symbol time density in a first portion of the transmission period and a second reference signal symbol time density in a second portion of the transmission period, wherein a first subset of the plurality of reference signal symbols in the first portion are spaced apart from each other by a first offset, and wherein a second subset of the plurality of reference signal symbols in the second portion are spaced apart from each other by a second offset different from the first offset; and
      transmit, to the wireless communication device in response to the transmission grant, the communication signal during the transmission period based on the selected starting location.

24. The apparatus of claim 23, wherein the association is based on locations of the plurality of reference signal symbols within the transmission period.

25. The apparatus of claim 24, wherein the association is based on a number of the plurality of reference signal symbols in the transmission period.

* * * * *